US006795223B2

(12) United States Patent
Kuba

(10) Patent No.: US 6,795,223 B2
(45) Date of Patent: Sep. 21, 2004

(54) SCANNING OPTICAL SYSTEM

(75) Inventor: Keiichi Kuba, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/259,464

(22) Filed: Sep. 30, 2002

(65) Prior Publication Data

US 2004/0061916 A1 Apr. 1, 2004

(51) Int. Cl.$^7$ .............................................. G02B 26/08
(52) U.S. Cl. ..................................................... 359/205
(58) Field of Search .............................. 359/211, 205, 359/208, 212

(56) References Cited

U.S. PATENT DOCUMENTS 6,333,820 B1 * 12/2001 Hayakawa et al. ......... 359/633

FOREIGN PATENT DOCUMENTS

| JP | 08-146320 | 6/1996 |
| JP | 08-327926 | 12/1996 |
| JP | 11-084291 | 3/1999 |

* cited by examiner

Primary Examiner—Euncha P. Cherry
(74) Attorney, Agent, or Firm—Kenyon & Kenyon

(57) ABSTRACT

The invention relates to a scanning optical system of small size, which is constructed of a reduced number of optical elements. A scanning optical system 10 comprises a prism. In forward ray tracing from a light source 11 to an image plane (the surface to be scanned), a light beam from the light source is collimated by a condensing optical system constructed of a first transmitting surface 1T, a second reflecting surface 1R and a second transmitting surface 2T into a substantially parallel light beam, which is then reflected and deflected at a two-dimensional scanner 12. The reflected and deflected light forms an image through an image-formation optical system constructed of a third transmitting surface 3T, a second reflecting surface 2R, a third reflecting (total reflection) surface 3R and a fourth transmitting surface 4T for two-dimensional scanning of the surface to be scanned.

13 Claims, 9 Drawing Sheets

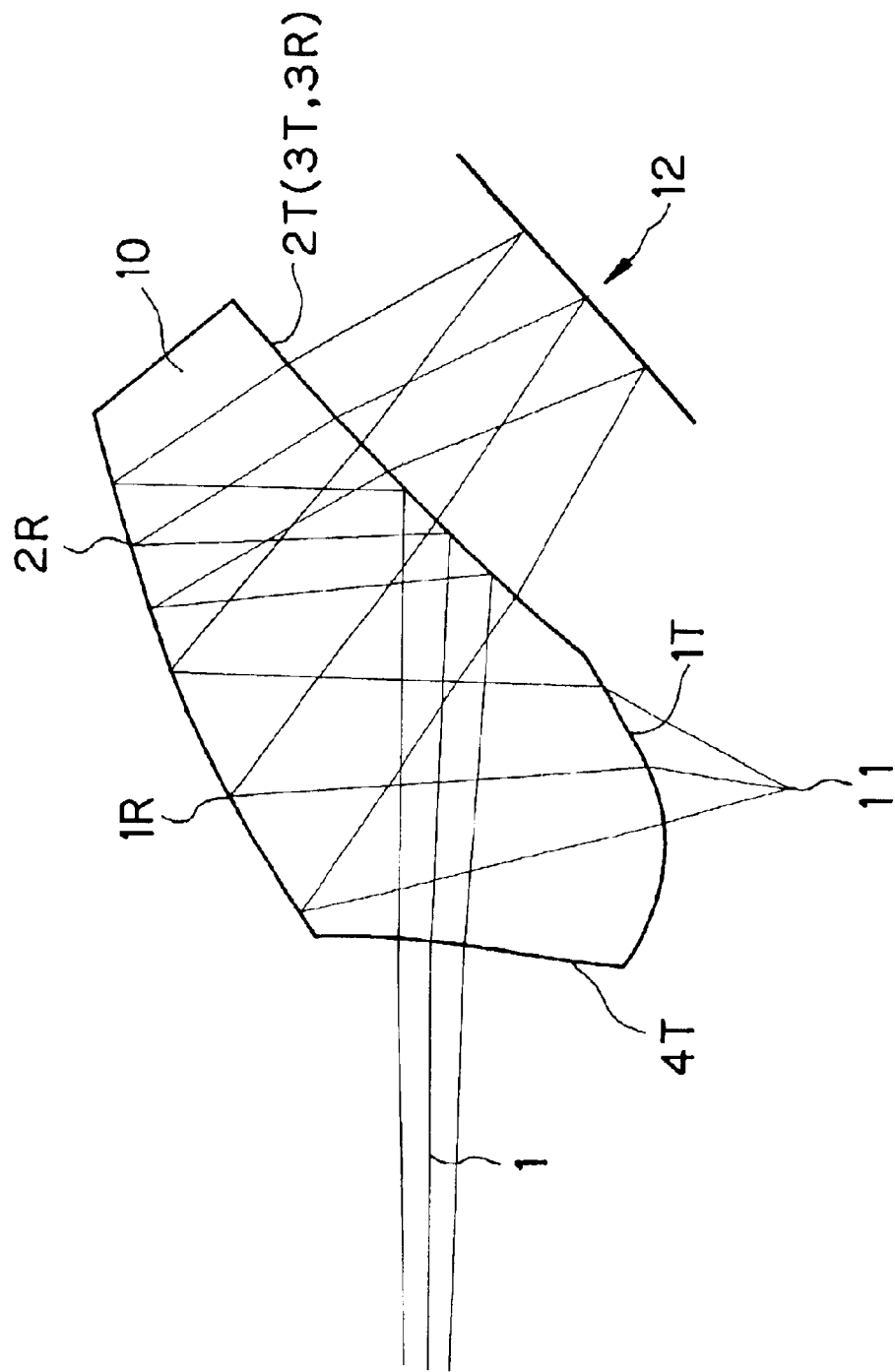

SCANNING OPTICAL SYSTEM

BACKGROUND OF THE INVENTION

The present invention relates generally to a scanning optical system, and more particularly to a scanning optical system comprising optical deflection means for deflecting light coming from a light source, so that the surface to be scanned is two-dimensionally scanned.

Exemplary prior scanning optical systems are shown in FIGS. 10 and 11. The scanning optical system shown in FIG. 10 (JP-A 08-327926) uses a condensing optical system comprising collimator lens 52, slit 53 and cylindrical lens 54, through which light leaving light source 51 is collimated and guided to rotary polygon mirror 55. The light reflected and deflected at rotary polygon mirror 44 is directed to image-formation lens 56 composed of two lens elements, so that image-formation surface 57 is subjected to one-dimensional scanning.

The scanning optical system shown in FIG. 11 (JP-A 08-146320) uses collimator lens 62 for collimating light leaving light source 61 into a parallel light beam, which is then reflected and deflected by deflection means 63, so that the surface 65 to be scanned is subjected to two-dimensional scanning by image-formation means 64.

However, the optical system of FIG. 10, because of being constructed of a considerable number of optical elements, places strict limitations on the precision of assembling and adjustment to achieve the necessary optical performance, and incurs some added expenses as well. For the optical system of FIG. 11, on the other hand, nothing is disclosed about its specific arrangement.

SUMMARY OF THE INVENTION

Having been accomplished to provide a solution to such problems with the prior art as mentioned above, the present invention has for its object to provide a scanning optical system of small size, which is constructed of a reduced number of optical elements.

According to the first aspect of the present invention, the aforesaid object is achieved by the provision of a scanning optical system comprising optical deflection means for deflecting light from a light source to scan the surface to be scanned and an image-formation optical system for focusing the light deflected by said optical deflection means on the surface to be scanned, thereby forming an image thereon, characterized in that:

said image-formation optical system comprises an optical member wherein a surface thereof having optical power and located nearest to the surface to be scanned has a transmission function alone, and said optical member comprises two or more reflecting surfaces, each of which has optical power and includes at least one rotationally asymmetric surface decentered with respect to an axial chief ray.

This scanning optical system is exemplified by Examples 1 to 6 given later.

The advantages (effects and actions) of the scanning optical system according to the first aspect of the invention are now explained. By allowing the optical member to comprise two or more reflecting surfaces, each of which has optical power and includes at least one rotationally asymmetric surface decentered with respect to an axial chief ray (hereinafter called the decentered, rotationally asymmetric surface), the "turn-back" effect is obtained so that the size of the optical system can be much more reduced than ever before. The reflecting surfaces of optical power, because of having both a lens action and a deflection action, contribute significantly to size reductions.

Referring here to an optical system comprising a rotationally symmetric reflecting surface having optical power and decentered with respect to an axial chief ray, light rays strike obliquely on that reflecting surface. Even with axial rays, accordingly, aberrations such as comas and astigmatisms are produced due to decentration. Such decentration aberrations may be corrected by configuring this reflecting surface in the form of a rotationally asymmetric surface as contemplated herein.

A problem with a general scanning optical system is that when light deflected by optical deflection means is entered on a decentered, rotationally symmetric surface, it is impossible to ensure any linear scan capability. However, this linear scan capability can be ensured by configuring the reflecting surface of an image-formation optical system in the form of a rotationally asymmetric reflecting surface.

Further, the use of the rotationally asymmetric surface enables the image-formation optical system to be formed of a two-dimensional f arcsine $\theta$ lens or a two-dimensional f$\theta$ lens. Consequently, the surface to be scanned can be easily subjected to constant-speed, two-dimensional scanning.

When optical deflection means with the angle of deflection changing linearly, such as a rotary polygon mirror, is used, an f$\theta$ lens may be used as the image-formation optical system capable of producing minus distortions. Consequently, the surface to be scanned can be scanned at a constant speed. When optical deflection means with the angle of deflection changing sinusoidally, such as a galvanometer mirror, is used, the image-formation optical system may be configured as an f arcsine $\theta$ lens by allowing it to produce distortions depending on the magnitude of the angle of deflection (plus distortion when the angle of deflection is small, and minus distortion when the angle of deflection is large). Consequently, the surface to be scanned can be subjected to constant-speed scanning.

In this case, the surface of the image-formation optical system, which has optical power and is located nearest to the surface to be scanned, is effective for correction of distortions because there is a large difference in light ray position between the angles of view, with a light beam of reduced diameter. It is noted that the function of this surface on correction of distortions becomes worse if this surface is designed to have a function of transmitting light and a function of reflecting light or to have a function of transmitting light and a function of transmitting light, because some restrictive conditions are placed on such a surface. It is noted that the surface formed of a single surface and designed to produce a plurality of optical functions will hereinafter called a combined surface. Thus, if that surface is designed to have a single optical function alone, i.e., only a transmission function as contemplated herein, it is then possible to make effective correction for distortions. It is also easy to ensure the angle of view.

According to the second aspect of the present invention, the scanning optical system of the first aspect is further characterized in that said optical member is configured in the form of a prism member.

This scanning optical system is exemplified by Examples 1–6 given later.

The advantages of the scanning optical system are now explained. Generally speaking, a reflecting surface must be more strictly controlled in terms of decentration errors than a refracting surface, and so its adjustment on assembling is an onerous task. However, if the reflecting surface of the optical member is configured as one surface of the prism member, then this problem can be solved because the whole positioning of the reflecting surface becomes easy.

Light rays incident from the deflection means on the prism member are refracted at the entrance surface of the prism member, so that the heights of off-axis light rays incident on the subsequent surfaces can be kept low. It is thus possible to reduce the size of the optical system and achieve a larger angle of view as well. In addition, the height of light rays depending on the off-axis light rays becomes so low that comas or the like can be reduced.

According to the third aspect of the invention, the scanning optical system of the first aspect is further characterized in that said optical member comprises at least one surface which has a function of transmitting light and a function of reflecting light. This surface should preferably be defined by a surface other than that located nearest to the surface to be scanned.

This scanning optical system is exemplified by Examples 1–6 given later.

The advantages of the scanning optical system are now explained. Since the two functions, transmission and reflection, occur at the same surface, the number of surfaces that form the image-formation system can be so reduced that it can be simplified and reduced in size. More preferably in this case, the reflection function should be total reflection function. When reflection at the combined surface is reflection at a reflecting film rather than total reflection, it is necessary to form the reflecting film for the reflecting surface at another position separate from a transmitting area for a transmitting surface, offering problems such as an increase in the size of the optical system and increased aberrations. In addition, the need of fabricating the reflecting film leads to added cost.

According to the fourth aspect of the invention, the scanning optical system of the second aspect is further characterized in that said prism member comprises three surfaces inclusive of one combined transmitting and reflecting surface.

This scanning optical system is exemplified by Examples 1–6 given later.

The advantages of the scanning optical system are now explained. When a prism member is used for the second scanning optical system of the invention, it should comprise at least an entrance surface, two reflecting surfaces and an exit surface. However, if at least three surfaces, i.e., a combined surface, a transmitting surface and a reflecting surface, are used to construct the prism member, then the prism member can be simplified in construction and reduced in size.

According to the fifth aspect of the invention, there is provided a scanning optical system comprising a condensing optical system for collimating a light beam from a light source into a substantially parallel beam, optical deflection means for deflecting light emerging from said condensing optical system for scanning the surface to be scanned, and an image-formation optical system for focusing light deflected by said optical deflection means on the surface to be scanned, thereby forming an image thereon, characterized in that:

a final surface of said condensing optical system, through which a light beam leaving said condensing optical system is entered into said optical deflection means, and a first surface of said image-formation optical system, through which a light beam is entered from said optical deflection means into said image-formation optical system, are defined by the same surface.

This scanning optical system is exemplified by Examples 1–6 given later.

The advantages of the scanning optical system are now explained. In forward ray tracing from the light source to the surface to be scanned, when the "final surface that forms the condensing optical system" and the "first surface of the image-formation optical system", which are the surfaces located before and after the optical deflection means, are configured as separate surfaces, two such surfaces must be located at separate positions; that is, it is required to space the surface located before the optical deflection means away from the surface located after the same or increase the angle of incidence of light rays on the optical deflection means.

However, as the surfaces located before and after the optical deflection means are spaced away from each other, the size of the optical system becomes large. As the angle of incidence of light rays on the optical deflection means increases, on the other hand, the area of the optical deflection means becomes large and so makes it difficult to ensure large angles of deflection or high deflection frequencies (scanning frequencies). In particular, this offers a grave problem with optical deflection means constructed of a single reflecting surface, as is the case with a micromachined scanner fabricated making use of such micromachining as set forth in JP-A 10-20226.

If the surfaces located before and after the optical deflection means are defined by the same surface, it is then possible to make the angle of incidence of light rays on the optical deflection means so small that the area of the optical deflection means can be decreased, thereby increasing the angle of deflection of the optical deflection means or achieving high deflection frequencies (scanning frequencies).

According to the sixth aspect of the invention, the scanning optical system of the fifth aspect is further characterized in that optically functional surfaces located before and after said optical deflection means are defined by transmitting surfaces.

This scanning optical system is exemplified by Examples 1–6 given later.

The advantages of the scanning optical system are now explained. In the forward ray tracing from the light source to the surface to be scanned, when the optically active surfaces located before and after the optical deflection means are defined by reflecting surfaces, both the final surface (reflecting surface 1) that forms the condensing optical system and the first surface (reflecting surface 2) that forms the image-formation optical system take the form of reflecting surfaces. In order to allow incident light on the reflecting surface 1 to arrive at that reflecting surface while unobstructed by the reflection type optical deflection means, it is necessary to increase the angle of incidence of light rays on the reflection type optical deflection means, increase the distance between the surfaces (reflecting surface 1=reflecting surface 2) located before and after the reflection type optical deflection means and the optical deflection means or make an angle between the entrance surface with respect to the optical deflection means and the primary scanning surface (both surfaces are not parallel with each other). This holds true for the case where light reflected at the reflecting surface 2 emerges while unobstructed by the reflection type optical deflection means. Whatever the case may be, however, there are several problems such as an increase in the area of the optical deflection means, an increase in the size of the optical system, and difficulty in making correction for decentration aberrations.

If the optically active surfaces located before and after the optical deflection means are configured as transmitting surfaces, then such problems can be overcome.

According to the seventh aspect of the invention, the scanning optical system of the fifth aspect is further characterized in that said image-formation optical system comprises at least one combined transmitting and reflecting surface.

This scanning optical system is exemplified by Examples 1–6 given later.

The advantages of the scanning optical system are now explained. Since the two actions, transmission and reflection, occur at the same surface, the number of surfaces that form the image-formation system can be so reduced that it can be simplified in construction and reduced in size. More preferably in this case, the reflection action should be total reflection action. When reflection at the combined surface is reflection at a reflecting film rather than total reflection, it is necessary to form the reflecting film for the reflecting surface at another position separate from a transmitting area for a transmitting surface, offering problems such as an increase in the size of the optical system and increased aberrations. In addition, the need of fabricating the reflecting film leads to added cost.

According to the eighth aspect of the invention, there is provided a scanning optical system comprising a condensing optical system for collimating a light beam from a light source into a substantially parallel beam, optical deflection means for deflecting light emerging from said condensing optical system for scanning the surface to be scanned, and an image-formation optical system for focusing light deflected by said optical deflection means into the surface to be scanned, thereby forming an image thereon, characterized in that:

said scanning optical system comprises a prism member, and said prism member includes at least a portion of said condensing optical system, and at least a portion of said image-formation optical system.

This scanning optical system is exemplified by Examples 1–6 given later.

The advantages of the scanning optical system are now explained. Since a portion of the condensing optical system and a portion of the image-formation optical system are configured with a single optical element, the number of parts that form the scanning optical system can be reduced. Consequently, the operation for position control on assembling for achieving the desired performance becomes easy, resulting in cost reductions.

According to the ninth aspect of the invention, the scanning optical system of the eighth aspect is further characterized in that said image-formation optical system comprises one prism member.

This scanning optical system is exemplified by Examples 1–3 and Example 6 given later.

With the ninth scanning optical system, the advantages of the eighth scanning optical system are much more enhanced.

According to the tenth aspect of the invention, a scanning optical system comprising a condensing optical system for collimating a light beam from a light source into a substantially parallel beam, optical deflection means for deflecting light emerging from said condensing optical system for scanning the surface to be scanned, and an image-formation optical system for focusing light deflected by said optical deflection means into the surface to be scanned, thereby forming an image thereon, as recited in any one of the 1st, 5th and 8th aspects of the invention is further characterized in that a total of at least three reflections occur at said condensing optical system and said image-formation optical system.

This scanning optical system is exemplified by Examples 1–6 given later.

The advantages of the scanning optical system are now explained. A total of at least three reflections enhance the "turn-back" effect, so that the effect on reducing the overall size of the scanning optical system is much more augmented.

According to the 11th aspect of the invention, the scanning optical system of the 8th aspect is further characterized in that said prism member including at least a portion of said condensing optical system, and at least a portion of said image-formation optical system has a combined transmitting and reflecting surface.

This scanning optical system is exemplified by Examples 1–6 given later.

The advantages of the scanning optical system are now explained. Since the two actions, transmission and reflection, occur at the same surface, the number of surfaces that form the optical system can be so reduced that it can be simplified construction and reduced in size. More preferably in this case, the reflection action should be total reflection action. When reflection at the combined surface is reflection at a reflecting film rather than total reflection, it is necessary to form the reflecting film for the reflecting surface at another position separate from a transmitting area for a transmitting surface, offering problems such as an increase in the size of the optical system and increased aberrations. In addition, the need of fabricating the reflecting film leads to added cost.

According to the 12th aspect of the invention, the scanning optical system of the 11th aspect is further characterized in that said prism member including at least a portion of said beam-condensing optical system, and at least a portion of said image-formation optical system has a combined transmitting and reflecting surface capable of three optical actions, i.e., two transmissions and one reflection.

This scanning optical system is exemplified by Examples 1–6 given later.

Referring to the advantages of the scanning optical system, the number of surfaces that form the scanning optical system can be much smaller than that of the 11th scanning optical system. If the surface of the prism member facing the optical deflection means is defined by such a combined surface, it is then possible to obtain the advantages of the 5th scanning optical system.

According to the 13th aspect of the invention, the 8th scanning optical system wherein said prism member comprises at least a portion of said condensing optical system, and at least a portion of said image-formation optical system is further characterized in that:

the portion of said condensing optical system included in said prism member comprises at least three surfaces, an entrance surface for said prism member, a rotationally asymmetric reflecting surface that has optical power and is decentered with respect to an axial chief ray, and an exit surface from said prism member, and the portion of said image-formation optical system included in said prism member comprises at least three surfaces, a reentrance surface for said prism member, a rotationally asymmetric reflecting surface that has optical power and is decentered with respect to an axial chief ray, and an re-exit surface from said prism member.

This scanning optical system is exemplified by Examples 1–6 given later.

The reflecting surfaces, each having optical power, have both a lens action and a deflection action, and so are greatly effective for reducing the size of the optical system. Since both the condensing optical system and the image-formation optical system can be reduced in size, the overall size of the present scanning optical system can be reduced.

Referring here to an optical system comprising a reflecting surface having optical power and decentered with respect to an axial chief ray, light rays strike obliquely on that decentered reflecting surface. Even with axial rays, accordingly, aberrations such as comas and astigmatisms are produced due to decentration. Such decentration aberrations may be corrected by configuring this reflecting surface in the form of a rotationally asymmetric surface.

A problem with a general scanning optical system is that when light deflected by optical deflection means is entered on a decentered surface, it is impossible to ensure linear scan capability. However, this linear scan capability can be ensured by configuring the reflecting surface of an image-formation optical system in the form of a rotationally asymmetric reflecting surface. Further, the use of the rotationally asymmetric surface enables the image-formation optical system to be formed of a two-dimensional f arcsine θ lens or a two-dimensional fθ lens. Consequently, the surface to be scanned can be easily subjected to constant-speed scanning.

With the rotationally asymmetric reflecting surface used at the portion of the condensing optical system included in the prism member, it is possible to achieve the function of shaping beams from a light source of oval shape in section such as an LD and the function of correcting field tilts.

Generally speaking, a reflecting surface must be more strictly controlled in terms of decentration errors than a refracting surface, and so its adjustment on assembling is an onerous task. However, if the reflecting surface of the optical member is configured as one surface of the prism member, then any adjustment operation for that reflecting surface can be dispensed with.

Light rays incident from the deflection means on the portion of the image-formation optical system of the prism member are refracted at the entrance surface of the prism member, so that the heights of off-axis light rays incident on the subsequent surfaces can be kept low. It is thus possible to reduce the size of the optical system and achieve a larger angle of view as well. In addition, the heights of light rays following the off-axis light rays become so low that comas or the like can be reduced.

According to the 14th aspect of the invention, the scanning optical system of any one of the 1st, 5th and 8th aspects is further characterized in that the rotationally asymmetric surface of said image-formation optical system has only one symmetric plane with respect to shape.

This scanning optical system is exemplified by Examples 1–6 given later.

The advantages of the scanning optical system are that the symmetric plane with respect to shape makes great contributions to productivity.

According to the 15th aspect of the invention, the scanning optical system of any one of the 1st, 5th and 8th aspects is further characterized in that the rotationally asymmetric surface of said beam-condensing optical system has only one symmetric plane with respect to shape.

This scanning optical system is exemplified by Examples 1–6 given later.

Referring to the advantages of the scanning optical system, the same advantages as in the 13th scanning optical system are obtained by the action and effect of the rotationally asymmetric surface, and the same advantages as in the 14th scanning optical system are obtained by the action and effect due to the incorporation of one symmetric plane with respect to shape. Thus, this embodiment is preferred in that the condensing optical system has such advantages as mentioned above.

According to the 16th aspect of the invention, the scanning optical system of any one of the 1st, 5th and 8th aspects is further characterized in that the rotationally asymmetric surface of said image-formation optical system is defined by a free-form surface having only one symmetric plane with respect to shape.

This scanning optical system is exemplified by Examples 1–6 given later.

The advantages of the scanning optical system are now explained. The free-form surface used herein is defined by the following formula (a), and the axis of the free-form surface is given by the Z axis for that defining formula.

$$Z = cr^2 / \left[1 + \sqrt{\{1 - (1+k)c^2 r^2\}}\right] + \sum_{j=2}^{66} C_j X^m Y^n \quad (a)$$

Here the first term of formula (a) is a spherical surface term, and the second term is a free-form surface term.

In the spherical surface term, c is the curvature of an apex, K is a conic constant, and $r = \sqrt{(X^2 + Y^2)}$.

The free-form surface term is $$\sum_{j=2}^{66} C_j X^m Y^n$$

$$Z = C_2 X + C_3 Y + C_4 X^2 + C_5 XY + C_6 Y^2 + C_7 X^3 + C_8 X^2 Y + C_9 X Y^2 +$$
$$C_{10} Y^3 + C_{11} X^4 + C_{12} X^3 Y + C_{13} X^2 Y^2 + C_{14} X Y^3 + C_{15} Y^4 + C_{16} X^5 +$$
$$C_{17} X^4 Y + C_{18} X^3 Y^2 + C_{19} X^2 Y^3 + C_{20} X Y^4 + C_{21} Y^5 + C_{22} X^6 +$$
$$C_{23} X^5 Y + C_{24} X^4 Y^2 + C_{25} X^3 Y^3 + C_{26} X^2 Y^4 + C_{27} X Y^5 + C_{28} Y^6 +$$
$$C_{29} X^7 + C_{30} X^6 Y + C_{31} X^5 Y^2 + C_{32} X^4 Y^3 + C_{33} X^3 Y^4 + C_{34} X^2 Y^5 +$$
$$C_{35} X Y^6 + C_{36} Y^7$$

Here $C_j$ (j is an integer of 2 or greater) is a coefficient.

In general, the aforesaid free-form surface has no symmetric plane at both the X-Z plane and the Y-Z plane. However, by reducing all the odd-numbered terms for X to zero, that free-form surface can have only one symmetric plane parallel with the Y-Z plane. For instance, this may be achieved by reducing to zero the coefficients for the terms $C_2$, $C_5$, $C_7$, $C_9$, $C_{12}$, $C_{14}$, $C_{16}$, $C_{18}$, $C_{20}$, $C_{23}$, $C_{25}$, $C_{27}$, $C_{29}$, $C_{31}$, $C_{33}$, $C_{35}$, . . . .

By reducing all the odd-numbered terms for Y to zero, the free-form surface can have only one symmetric plane parallel with the X-Z plane. For instance, this may be achieved by reducing to zero the coefficients for the terms $C_3$, $C_5$, $C_8$, $C_{10}$, $C_{12}$, $C_{14}$, $C_{17}$, $C_{19}$, $C_{21}$, $C_{23}$, $C_{25}$, $C_{27}$, $C_{30}$, $C_{32}$, $C_{34}$, $C_{36}$, . . . .

By using any one of the aforesaid symmetric planes and deflecting it in that symmetric plane direction, rotationally asymmetric aberrations produced due to decentration are effectively corrected while, at the same time, productivity is improved.

It is here noted that the free-form surface may be defined by other defining formulae such as Zernike polynomial.

According to the 17th aspect of the invention, the scanning optical system of any one of the 1st, 5th and 8th aspects is further characterized in that said optical deflection means is defined by a single two-dimensional optical deflecting means capable of two-dimensional deflection by itself.

This scanning optical system is exemplified by Examples 1–5 given later.

The advantages of the scanning optical system are now explained. To make the area of the optical deflection means small, the optical deflection means must be located in the vicinity of the entrance pupil of the image-formation optical system. Consider the case where two one-dimensional optical deflection means are used for two-dimensional scanning. To diminish the size of the optical deflection means, the two one-dimensional deflection means must be located in conjugative relations to each other or the spacing between them must be narrowed, resulting in problems that the construction of the optical system becomes complicated and large, restrictive conditions for the layout of the optical system increase, etc. With a single optical deflection means capable of two-dimensional deflection, the optical system can be so easily laid out that it can be reduced in size and simplified in construction.

According to the 18th aspect of the invention, the scanning optical system of any one of the 1st, 5th and 8th aspects is further characterized in that said optical deflection means has a sinusoidally changing angle of deflection.

This scanning optical system corresponds to Examples 1, 2, 4, 5 and 6 given later as well as to Example 3 provided that electrical correction of image distortions must be made.

The advantages of the scanning optical system are now explained. For instance, a micromachined scanner fabricated making use of such micromachining as set forth in JP-A 10-20226 comprises a single reflecting mirror. Upon high-speed scanning, this reflecting mirror vibrates sinusoidally to reflect and deflect light. With such optical deflection means, not only are size and cost reductions achievable but also high-speed scanning is achievable with reduced power consumption. If, in this case, the image-formation optical system of the scanning optical system is configured in the form of an f arcsine θ lens, it is then possible to carry out constant-speed scanning for the surface to be scanned.

According to the 19th aspect of the invention, the scanning optical system of the 18th aspect is further characterized in that said optical deflection means having a sinusoidally changing angle of deflection is capable of using up to 95% of the amplitude of an angle of deflection of light for scanning.

This scanning optical system corresponds to Examples 1, 2, 4, 5 and 6 given later as well as to Example 3 provided that electrical correction of image distortions must be made.

The advantages of the scanning optical system are now explained with reference to a reflection type deflector such as a galvanometer mirror. As shown in FIG. 9($a$), consider the case where there is used a reflection type deflector (reflection type deflection means) wherein the deflection angle θ of its reflecting surface from a reference reflecting surface changes sinusoidally. To carry out constant-speed scanning without recourse to any electrical correction of image distortions, it is then required that the image-formation optical system be configured in the form of an f arcsine θ lens.

Here assume that with deflecting means wherein the deflection angle of its reflecting surface changes sinusoidally at an amplitude $\phi_0/k$, the surface to be scanned is scanned making use of a deflection angle ($\pm\phi_0$) that is k times as large as the amplitude of the deflection angle of the reflecting surface. To configure the image-formation optical system in the form of an f arcsine θ lens, it is then required to satisfy the following condition (0<k≦−1):

Image Height $y=f\cdot2(\phi_0/k)\arcsin\{\phi/(\phi_0/k)\}$

To configure the image-formation system in the form of an f arcsine θ lens well fit for the whole range of an angle of deflection of about ±20°, it is necessary to produce some considerable plus distortions, rendering the design of the image-formation system difficult. By making use of only an area where the linearity of $\phi/(\phi_0/k)$ is better, however, it is easy to configure the image-formation system as an f arcsine θ lens.

At k≦0.95, the linearity of $\phi/(\phi_0/k)$ is at most about half that in the case of k=1, so that it is easy to configure the image-formation optical system as an f arcsine θ lens. It is thus possible to simplify the optical system with size reductions.

As is the case of a conventional display having a blanking interval of the order of 17%, a scanning optical system, too, cannot utilize the whole range of the angle of deflection by reason of electrical processing. In the present invention, however, the upper limit to the amplitude of the angle of deflection of the deflection means is about 95% because images can be displayed without recourse to an ordinary display.

As shown in FIG. 9($b$), the foregoing explanation goes true for a transmission type of optical deflection means such as an acousto-optic deflector ADO; however, it is noted that the angle of deflection is given by 2φ.

According to the 20th aspect of the invention, the scanning optical system of any one of the 1st, 5th and 8th aspects is further characterized in that constant-speed scan capability is electrically corrected.

This scanning optical system may be embodied as desired.

The advantages of the 20th scanning optical system are now explained. Especially when, on two-dimensional scanning, two-dimensional linear scan capability and constant-speed scan capability are ensured by allowing the image-formation optical system to produce suitable distortion in conformity with the deflection characteristics of the optical deflection means, the scanning optical system becomes complicated and large. On two-dimensional scanning at high speed, on the other hand, it is difficult to make electrical, real-time correction for image distortions due to linear scan capability, because that correction is two-dimensional one.

If the linear scan capability is ensured by the image-formation optical system and constant-speed scan capability is done by electrical correction, then the scanning optical system can be simplified in construction and reduced in size. In addition, the scanning optical system is compatible with high-speed scanning because the image distortions can be electrically corrected per scanning line in the main scanning direction.

In this case, when all of the amplitude of the sinusoidally changing angle of deflection is harnessed, there is too large a scanning speed difference between in the vicinity of the center of an image to be scanned at high speed and in the vicinity of the periphery of an image to be scanned at low speed. Consequently, even when electrical correction of image distortions is made, it is difficult to make that correction with high precision. It is thus preferable to make use of about 85% of the amplitude of the angle of deflection, because correction of the constant-speed scan capability is improved in approximately two steps.

According to the 21st aspect of the invention, the scanning optical system of any one of the 1st, 5th and 8th aspects is further characterized in that the angle of deflection by said optical deflecting means changes linearly.

This scanning optical system is exemplified by Example 3 given later (and corresponds to Examples 1, 2 and 4–6, too, with the proviso that image distortions are electrically corrected).

The advantages of the scanning optical system are now explained. The rotary polygon mirror rotates at a constant speed, and so the angle of optical deflection changes linearly. If the rotary polygon mirror is used as optical deflection means, it is then possible to ensure a large angle of deflection with that optical deflection means and make the field angle of the scanning optical system large. At this time, if an fθ lens is used as the image-formation optical system for the scanning optical system, the surface to be scanned can then be scanned at a constant speed.

According to the 22nd aspect of the invention, the scanning optical system of any one of the 1st, 5th and 8th aspects is further characterized in that said-image formation optical system has only one symmetric plane with respect to shape and is decentered only in said symmetric plane with respect to plane, said scanning optical system satisfying the following formula:

$$\phi_2\theta_1/\phi_1\theta_2 < 1 \quad (1)$$

Here $\theta_2$ is the half field angle of the image-formation optical system in a symmetric plane direction on the side of the surface to be scanned, $\theta_1$ is the half field angle of the image-formation optical system in a plane direction perpendicular to the symmetric plane, $2\phi_2$ is the one-side angle of deflection of the optical deflecting means needed for scanning of the surface to be scanned in the symmetric plane direction, and $2\phi_1$ is the one-side angle of deflection of the optical deflecting means necessary for scanning of the surface to be scanned in a plane direction perpendicular to the symmetric plane.

This formula indicates that when it comes down to such reflection type deflecting means as a polygon or galvanometer mirror, the one-side deflection angle of the reflecting mirror necessary for scanning is given by $\phi_1$, and $\phi_2$. The one-side deflection angle of the reflecting mirror, used herein, is understood to refer to a maximum angle of deviation from the surface of the reflecting mirror corresponding to the center of the surface to be scanned; however, this does not always mean that the optical deflection means, i.e., the reflecting mirror deflects $\pm\phi$. To put it another way, when a part of the amplitude of the reflecting mirror is used to scan the surface to be scanned, the deflection angle used therefor is $\pm\phi$. For such a transmission type of optical deflecting means as an acousto-optical deflector AOD, the one-side angle of deflection is represented by $2\phi_1$ and $2\phi_2$ (see FIG. 9). This scanning optical system is exemplified by Examples 1–6 given later.

The advantages of this scanning optical system are now explained with reference to such a reflection type of optical deflection means as a polygon or galvanometer mirror (see FIG. 9(a)). Here assume that when the one-side deflection angle of the reflection type optical deflection means is $\phi$ (or when the angle of deflection is $2\phi$), the half field angle on scanning of the image-formation optical system is $\theta$. Then, the pupil magnification of the image-formation optical system upon forward ray tracing is given by $2\phi/\theta$.

As already set forth herein, it is preferable that the image-formation optical system has only one symmetric plane with respect to shape, and is decentered in that symmetric plane alone, because the productivity of the image-formation optical system is improved with cost reductions. In this case, it is easy to ensure a wide field angle in the direction vertical to the symmetric plane with respect to shape, and so it is desired that this direction be determined as the scanning direction of a one-dimensional scanning optical system or as a direction in which the scanning field angle of a two-dimensional optical system becomes large. It is then noted that the image-formation optical system is difficult to construct, because the optical system must be designed in such a way that the decentered surface of the image-formation optical system does not interfere with the rest in the plane direction in which the image-formation optical system is decentered.

To remove such difficulty, it is preferable that the pupil magnification of the image-formation optical system in the direction in which it is decentered (in the symmetric plane direction of the image-formation optical system with respect to shape) is smaller than that in the direction vertical to the symmetric plane, thereby reducing the beam spread angle in the image-formation optical system, because it is easier to construct the image-formation optical system.

More specifically, it is desired to satisfy the following formula:

$$1 > \text{pupil magnification in the symmetric plane/pupil}$$
$$\text{magnification in the plane vertical to the symmetric plane} =$$
$$(2\phi_2/\theta_2)/(2\phi_1/\theta_1) = \phi_2\theta_1/\phi_1\theta_2$$

When the symmetric plane direction of the image-formation optical system with respect to shape is determined as the sub-scanning direction and the direction vertical to the symmetric plane as the main scanning direction, the resolving power of the image-formation optical system in the main scanning direction must be made equal to that in the sub-scanning direction by making the size of the optical deflection means in the sub-scanning direction larger than that in the main scanning direction. This image-formation optical system is well compatible with high-speed scanning because of a decrease in its size in the main scanning direction in which high-speed scanning is necessary for two-dimensional scanning.

According to the 23rd aspect of the invention, the scanning optical system of the 22nd aspect is further characterized by satisfying the following condition:

$$NA2/NA1 > 1 \quad (2)$$

Here NA2 is the numerical aperture of a light beam that is incident from the light source in the symmetric plane direction with respect to shape on the condensing optical system, and NA1 is the numerical aperture of a light beam that is incident from the light source in the direction vertical to the symmetric plane with respect to shape on the condensing optical system.

This scanning optical system is embodied by Examples 1–6 given later.

The advantages of the scanning optical system are now explained. When the symmetric plane direction of the image-formation optical system with respect to shape is determined as the sub-scanning direction and the direction vertical to the symmetric plane as the main scanning direction, the resolving power of the image-formation optical system in the main scanning direction must be made equal to that in the sub-scanning direction by making the size of the optical deflection means in the sub-scanning direction larger than that in the main scanning direction.

In order that the light leaving the light source has the aforesaid shape at the scanning means, it is preferable to satisfy condition (2) because the condensing optical system is easier to construct.

Still other objects and advantages of the invention will in part be obvious and will in part be apparent from the specification.

The invention accordingly comprises the features of construction, combinations of elements, and arrangement of

BRIEF DESCRIPTION OF THE DRAWINGS

FIG. 8 is an optical path diagram for Example 6 of the scanning optical system according to the present invention.

DESCRIPTION OF THE PREFERRED EMBODIMENTS

Examples 1 through 6 of the scanning optical system according to the present invention are now explained with reference to the accompanying drawings.

In what follows, the main scanning direction is defined by an X-direction and the sub-scanning direction by a Y-direction.

Figure 1:
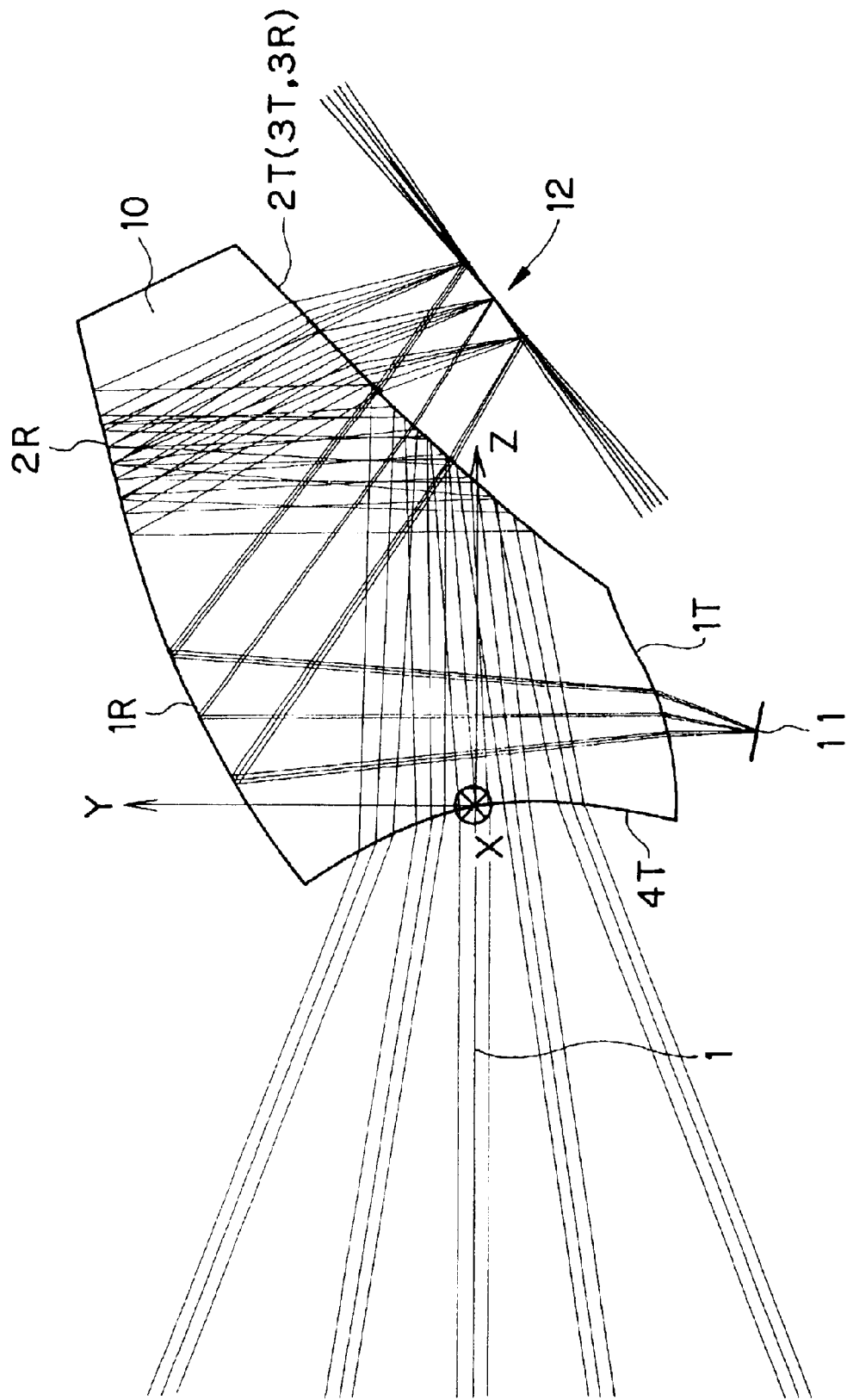
FIG. 1 is an optical path diagram for Example 1 of the scanning optical system according to the present invention.

Constitutional parameters obtained in back ray tracing for each example will be enumerated later. In the constitutional parameters, an axial chief ray 1 is defined by a light ray passing vertically through the center of the surface to be scanned (not shown) and arriving at the center of a light source 11 via optical deflection means 12 upon back ray tracing, as shown in FIG. 1.

In the back ray tracing, the first surface 4T returned back to a non-decentered state (although actually decentered in the Y-direction) is defined as the origin of the decentered optical system. The Z-axis direction is defined by a direction along the axial chief ray 1; the positive Z-axis direction by a direction from the surface to be scanned toward the first surface 4T of the optical system 10; the Y-Z plane (a plane in FIG. 1) by a plane including this Z-axis and the center of the surface to be scanned; the positive X-axis direction by a direction that passes through the origin, intersects perpendicularly with the Y-Z plane and turns from before the paper toward the back direction; and the Y-axis by an axis that forms a right-handed orthogonal coordinate system. This coordinate system is shown in FIG. 1. However, such a coordinate system is not given for FIGS. 4 to 8 that show other examples.

Given for a decentered surface are the amount of decentration of the apex of that surface from the center of the origin of the aforesaid coordinate system (in the X, Y and Z-axis directions represented by X, Y and Z) and the angles ($\alpha$, $\beta$, $\gamma$(°)) of tilt of the center axis (the Z axis in the following formula (a) for a free-form surface) with respect to the X-axis, the Y-axis, and the Z-axis, respectively. It is here noted that the positive $\alpha$ and $\beta$ mean counterclockwise rotation with respect to the positive directions of the respective axes, and the positive $\gamma$ means clockwise rotation with respect to the positive direction of the Z axis.

In Examples 1 to 6, each surface is decentered in this Y-Z plane, and only one symmetric plane for each rotationally asymmetric free-form surface is given by the Y-Z plane.

Regarding the optically active surfaces forming the optical system of each example, when a specific surface (including a virtual surface) and the subsequent surface form a coaxial optical system, a surface spacing is given. Besides, the refractive indices of media and Abbe's numbers are given as usual.

The free-form surface used herein is of such a shape as defined by the aforesaid equation (a), and the Z-axis of that defining equation is the axis of the free-form surface.

The DOE (diffractive optical element) is designed by Sweatt method (an ultra-high index method) (W. C. Sweatt, "Mathematical equivalence between a holographic optical element and an ultra-high index lens", J. Opt. Soc. Am., Vol. 69, No. 3(1979) at a reference wavelength=587.56 nm (d-line), at which the refractive index of an ultra-high index lens=1001 and the Abbe constant=−3.45.

It is here noted that the term with respect to free-form surfaces with no data is zero. The refractive index is given with respect to d-line (587.56 nm wavelength), and the length and angle are given in mm and °.

Among other formulae for defining the free-form surface, there is Zernike polynomial, given below. The shape of this surface is given by the following formula. The axis for Zernike polynomial is given by the Z axis for the defining formula. The rotationally asymmetric surface is defined by polar coordinates for the height of the Z axis with respect to the X-Y plane provided that R is the distance from the Z axis within the X-Y plane and A is the azimuth angle round the Z axis, as expressed by the angle of rotation measured from the X-axis.

$$x = R \times \cos(A)$$

$$y = R \times \sin(A)$$

$$\begin{aligned}Z = & D_2 + D_3 R\cos(A) + D_4 R\sin(A) + D_5 R^2 \cos(2A) + \\ & D_6(R^2 - 1) + D_7 R^2 \sin(2A) + D_8 R^3 \cos(3A) + \\ & D_9(3R^3 - 2R)\cos(A) + D_{10}(3R^3 - 2R)\sin(A) + \\ & D_{11} R^3 \sin(3A) + D_{12} R^4 \cos(4A) + D_{13}(4R^4 - 3R^2)\cos(2A) + \\ & D_{14}(6R^4 - 6R^2 + 1) + D_{15}(4R^4 - 3R^2)\sin(2A) + \\ & D_{16} R^4 \sin(4A) + D_{17} R^5 \cos(5A) + D_{18}(5R^5 - 4R^3)\cos(3A) + \\ & D_{19}(10R^5 - 12R^3 + 3R)\cos(A) + \\ & D_{20}(10R^5 - 12R^3 + 3R)\sin(A) + D_{21}(5R^5 - 4R^3)\sin(3A) + \\ & D_{22} R^5 \sin(5A) + D_{23} R^6 \cos(6A) + D_{24}(6R^6 - 5R^4)\cos(4A) + \\ & D_{25}(15R^6 - 20R^4 + 6R^2)\cos(2A) + \\ & D_{26}(20R^6 - 30R^4 + 12R^2 - 1) + \end{aligned} \quad \text{(b)}$$

-continued $$D_{27}(15R^6 - 20R^4 + 6R^2)\sin(2A) +$$
$$D_{28}(6R^6 - 5R^4)\sin(4A) + D_{29}R^6\sin(6A)$$

It is noted that when this free-form surface is designed in the form of an optical system symmetric in the X-axis direction, $D_4$, $D_5$, $D_6$, $D_{10}$, $D_{11}$, $D_{12}$, $D_{13}$, $D_{14}$, $D_{20}$, $D_{21}$, $D_{22}$, . . . are used.

Besides, there is the following defining formula:

$$Z = \Sigma\Sigma C_{nm} XY$$

When expanded with respect to k=7 (the seventh term) as an example, this may be expressed by the following formula:

$$Z = C_2 + C_3Y + C^4|X| + C_5Y^2 + C_6Y|X| + C_7X^2 + C_8Y^3 + \qquad (c)$$
$$C_9Y^2|X| + C_{10}YX^2 + C_{11}|X^3| + C_{12}Y^4 + C_{13}Y^3|X| +$$
$$C_{14}Y^2X^2 + C_{15}Y|X^3| + C_{16}X^4 + C_{17}Y^5 + C_{18}Y^4|X| +$$
$$C_{19}Y^3X^2 + C_{20}Y^2|X^3| + C_{21}YX^4 + C_{22}|X^5| + C_{23}Y^6 +$$
$$C_{24}Y^5|X| + C_{25}Y^4X^2 + C_{26}Y^3|X^3| + C_{27}Y^2X^4 +$$
$$C_{28}Y|X^5| + C_{29}X^6 + C_{30}Y^7 + C_{31}Y^6|X| + C_{32}Y^5X^2 +$$
$$C_{33}Y^4|X^3| + C_{34}Y^3X^4 + C_{35}Y^2|X^5| + C_{36}YX^6 + C_{37}|X^7|$$

While the shapes of the surfaces used in the examples of the invention are expressed by the free-form surfaces using the formula (a), it is understood that similar actions and effects are obtainable even by use of the aforesaid formulas (b) and (c).

EXAMPLE 1

FIG. 1 is a Y-Z plane schematic of Example 1 of the scanning optical system of the invention inclusive of its optical axis (a sectional schematic in the plane of the sub-scanning direction). This scanning optical system has a horizontal field angle of 54° and a vertical field angle of 42°, and the optical deflection means is φ1 mm in size.

This scanning optical system, shown generally at 10, is designed such that the luminance of a light source 11 is modulated by means (not shown) for modulating the luminance of a light source depending on image signals for two-dimensional scanning (raster scanning) depending on the image signals, thereby forming an image on the surface to be scanned, located in front of the image-formation optical system and at a position 1 mm away therefrom, to two-dimensionally scan that surface.

Referring to an optical path for this scanning optical system 10 in forward ray tracing from the light source 11 to an image plane (the surface to be scanned, not shown), a light beam from the light source is collimated by a condensing optical system constructed of a first transmitting surface 1T, a first reflecting surface 1R and a second transmitting surface 2T into a substantially parallel beam, which is in turn reflected and deflected at a two-dimensional scanner 12. The reflected and deflected beam forms an image through an image-formation optical system constructed of a third transmitting surface 3T, a second reflecting surface 2R, a third reflecting (total reflection) surface 3R and a fourth transmitting surface 4T on the surface to be scanned, thereby two-dimensionally scanning that surface.

Figure 2:
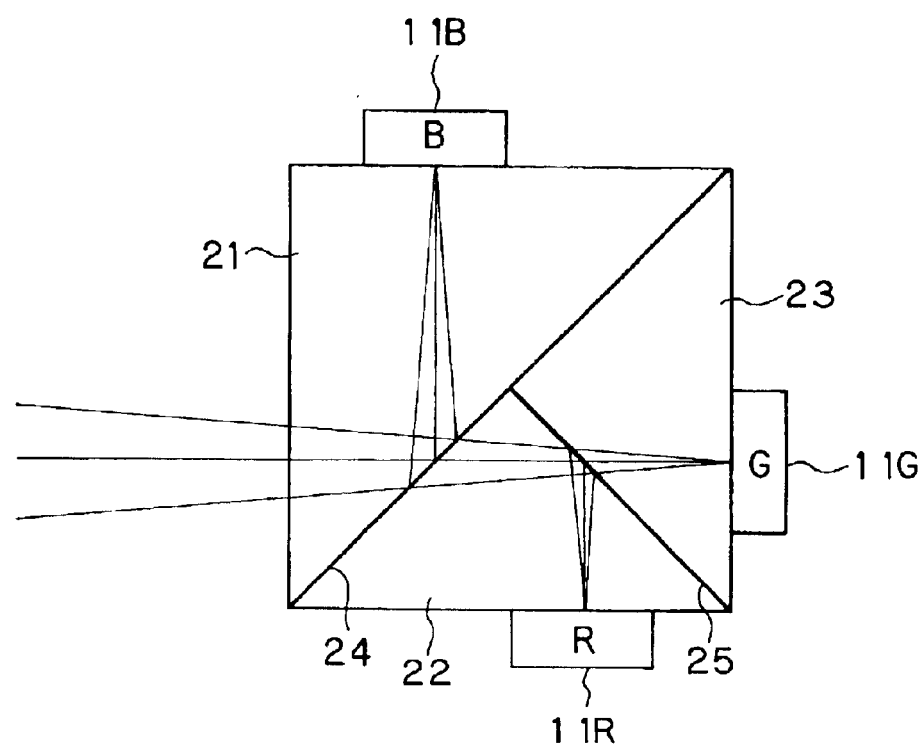
FIG. 2 is illustrative of one example of the construction of a plurality of monochromatic light sources used for color displays.

For the light source, an LED, an LD or the like may be used. If a plurality of monochromatic light sources are used as shown in FIG. 2 as an example, then color displays can be achieved. In FIG. 2, for instance, a dichroic mirror 24 for reflecting short-wavelength light, for instance, light of up to 500 nm in wavelength, is coated on a joint surface of light-source prisms 21 and 22, each formed of a right-angle prism, and a dichroic mirror 25 for reflecting long-wavelength light, for instance, light of at least 600 nm in wavelength, is coated on a joint surface of light-source prisms 22 and 23, each formed of a right-angle prism. Then, B light source $11_B$, R light source $11_R$ and G light source $11_G$ are bonded to positions conjugate to image points on the surface to be scanned at the respective wavelengths of the light-source prisms 21, 22 and 23, thereby eliminating the influence of chromatic aberrations of the scanning optical system.

With this arrangement, RGB light may be guided to the scanning optical system 10 for color displays. At this time, the luminance of R light, G light, and B light is modulated by an RGB intensity modulator (not shown) for each pixel on the basis of image signals.

Some scanners may be used for the scanning means (two-dimensional scanner) 12. However, it is noted that a micromachined scanner fabricated by making use of micromachining such as one set forth in JP-A 10-20226 is best suited for use with a miniature optical system because of some advantages such as compactness and low power consumption.

Figure 3:
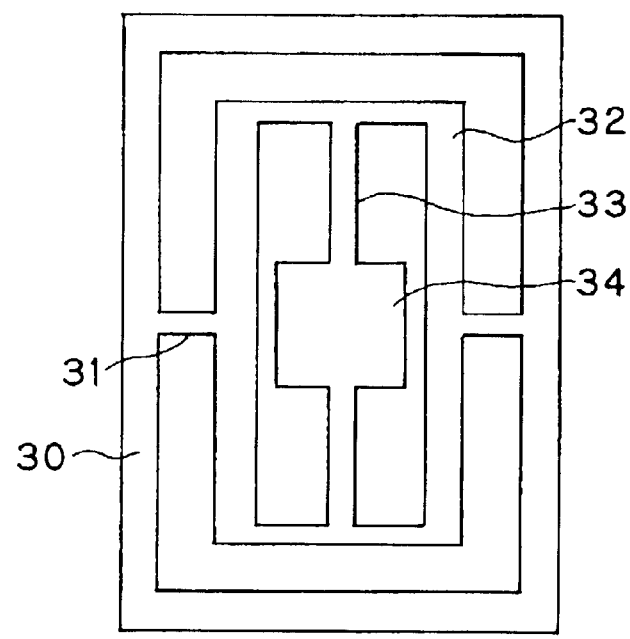
FIG. 3 is a plan schematic of one example of a two-dimensional micromachined scanner.

In this case, use may be made of micromachined scanners of various driving modes such as electromagnetic, electrostatic, and piezoelectric driving modes. One example of a two-dimensional micromachined scanner is shown in FIG. 3 in a plan view form. In this example, a mirror portion 34 is joined to an intermediate framework 32 with a torsion bar 33 that extends in a Y-axis direction, and that intermediate framework 32 is joined to an outer framework 30 with a torsion bar 31 that extends in an X-axis direction, so that horizontal scanning (scanning in the X-direction) occurs due to rocking movement around the torsion bar 33 and vertical scanning (scanning in the Y-direction) takes place due to rocking movement around the torsion bar 31.

In general, when a rotary polygon mirror having a plurality of reflecting surfaces is used as a scanner, the optical system must have a function of correction of field tilts. However, such a micromachined scanner as shown in FIG. 3 has only one reflecting surface 34 and any field tilt that presents a problem is not caused for structural reasons; the optical system should not have any function of correction of field tilts so that it can be structurally simplified.

In this case, it is desired that the angle of incidence, $\theta_S$, of an axial chief ray on a reference surface for the reflecting surface satisfy the following formula:

$$\theta_S \leq 45°$$

As the upper limit of 45° to this condition exceeds, it is difficult to ensure a large angle of deflection and a high scanning frequency because of an increase in the area of the reflecting surface. This holds true even for the case where the same light beam is reflected and deflected. In this example, $\theta_S = 20°$.

In this example, one-way scanning is not only feasible at the deflection angle of the sinusoidally reciprocating, but double-way scanning is also feasible. Double-way scanning is well compatible with high-speed scanning because the scanning frequency of the scanning means can be reduced in half.

The advantages of the scanning optical system 10 according to this example are now explained. Since the condensing optical system and image-formation optical system are constructed of one prism member 10, the number of parts can be much reduced as compared with conventional systems, and so the optical system can be much reduced in size and cost than ever before. A reduced number of parts enable alignment operations to be dispensed with, so that it is easy to ensure performance upon fabrication.

A total of four reflections occur, one at the condensing optical system, two at the image-formation optical system and one at the scanner, so that the size of the optical system can be reduced by the "turn-back" effect. Since the main power of the scanning optical system 10 is born by the reflecting surface, chromatic aberrations are less likely to occur, and even when an LD is used as the light source, the optical performance of the scanning optical system 10 is less susceptible to fluctuations due to the fluctuations of the LD with wavelengths. By the combination of the second reflecting surface 2R having a convex power action with the third reflecting (total reflection) surface 3R having a concave power action, field curvature can be corrected all over the scanning field angle.

Due to the presence of the combined surface 2T (3T, 3R) that is a combined reflecting and transmitting surface, the number of surfaces that form the optical system can be reduced, resulting in reductions in the size of the condensing optical system and image-formation optical system. It is then preferable to configure that surface in the form of a concave surface because reflection occurs in the form of total reflection.

With regard to linear scan capability and constant-speed scan capability, a general problem with a reflection type optical system is how is the linear scan capability ensured. In this example, two-dimensional linear scan capability is ensured because the reflecting surface has a rotationally asymmetric shape for correction of decentered aberrations.

The deflection angle of the scan mirror 12 necessary for two-dimensional scanning is φx=±7.95° and φy=±3.20°. In this case, the image-formation optical system has φ arcsine θ lens characteristics with respect to about 65% of the sinusoidally vibrating scan mirror, two-dimensional linear, constant-speed scanning can be effected (65% of the amplitude of the deflection angle of the scan mirror in the X-direction, φx=±12.2°, account for the deflection angle of the mirror necessary for scanning in the X-direction, φx=±7.95°, and 65% of the amplitude of the deflection angle of the scan mirror in the Y-direction, φy=±4.93°, account for the deflection angle of the mirror necessary for scanning in the Y-direction, φx=±3.20°).

In order to configure the image-formation optical system in the form of an f arcsine θ lens when the deflection angle of the scan mirror 12 is substantially in the range defined herein, it is necessary to produce plus distortions at the image-formation optical system. If, as in this example, the surface 4T of the image-formation optical system, which has optical power and is located nearest to the surface to be scanned, is configured in the form of an independent surface having a transmitting action alone, it is then possible to make effective correction for the distortions. It is also easy to ensure the desired field angle.

It is here noted that if electrical correction of image distortions (correction of constant-speed scan capability) is carried out to convert a non-constant-speed scan image formed by the image-formation optical system into a constant-speed scan image, it is then possible to make full use of the amplitude of the sinusoidally vibrating scan mirror or a scanner with the deflection angle of a scan mirror changing linearly.

The condensing optical system has also a beam-shaping function. When the deflection means is f1 mm, the numerical aperture NA of the condensing optical system on the light-source side is 0.16 in the X-direction and 0.19 in the Y-direction.

In this example, a two-dimensional image is formed by two-dimensional scanning of point sources 11 of light. However, it is acceptable to one-dimensionally scan a linear array of light sources.

In this example, the scanning optical system is designed on the assumption that the size of the scanner in the X-direction is equal to that in the Y-direction. In order to make the resolving power of the scanner in the X-direction equal to that in the Y-direction on the side of the surface to be scanned or for other purposes, however, it is acceptable that the size of the scanner 12 in the X-direction is not equal to that in the Y-direction.

EXAMPLE 2

Figure 4:
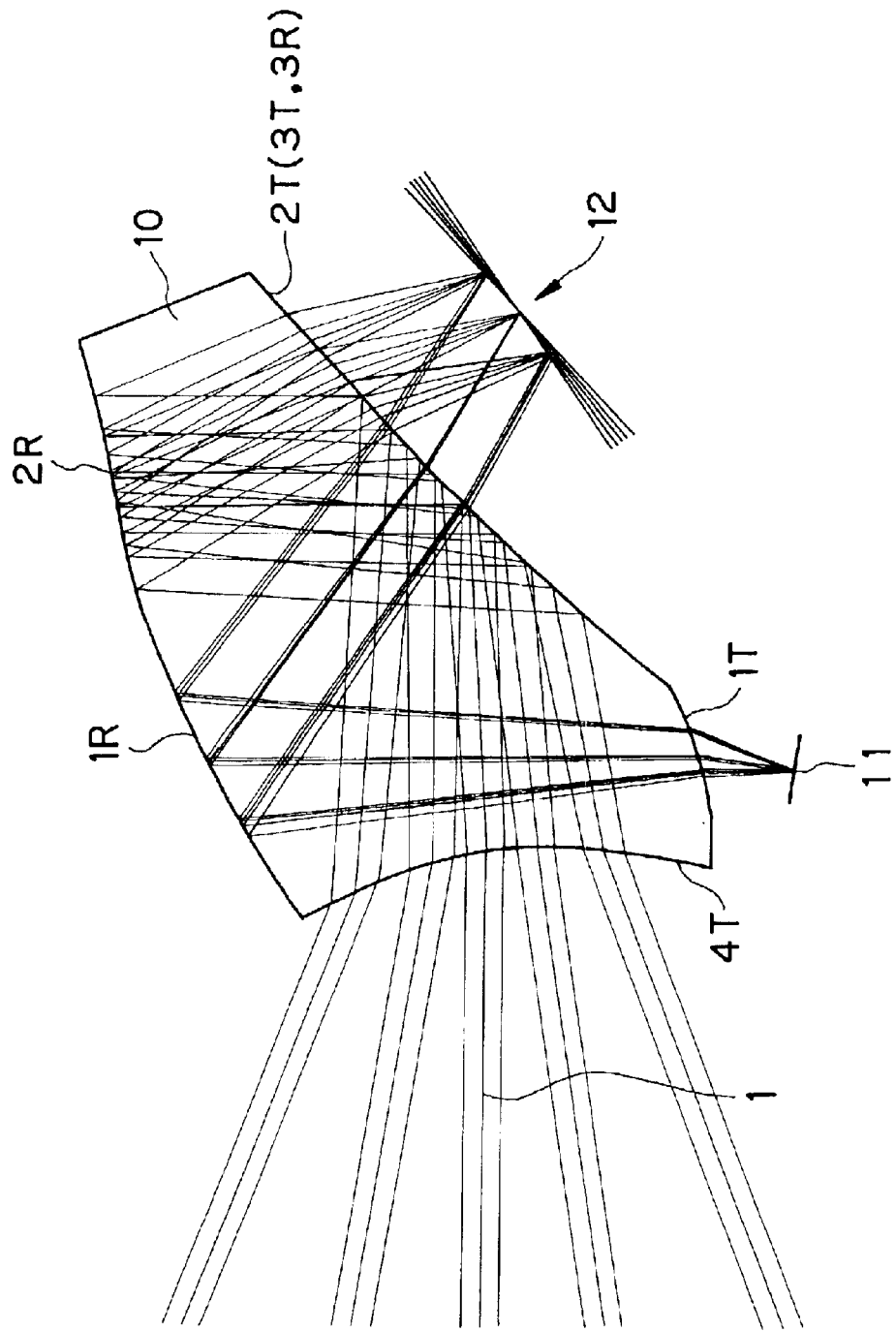
FIG. 4 is an optical path diagram for Example 2 of the scanning optical system according to the present invention.

The scanning optical system of this example is shown in FIG. 4 similar to FIG. 1, and has a horizontal field angle of 54° and a vertical field angle of 42°.

This scanning optical system 10 is constructed as in Example 1. To be specific, the luminance of a light source 11 is modulated by means (not shown) for modulating the luminance of a light source depending on image signals for two-dimensional scanning (raster scanning) depending on the image signals, thereby forming an image on the surface to be scanned, located in front of the image-formation optical system and at a position 1 mm away therefrom, to two-dimensionally scan that surface.

Referring to an optical path for this scanning optical system 10 in forward ray tracing from the light source 11 to an image plane (the surface to be scanned, not shown), a light beam from the light source is collimated by a condensing optical system constructed of a first transmitting surface 1T, a first reflecting surface 1R and a second transmitting surface 2T into a substantially parallel beam, which is in turn reflected and deflected at a two-dimensional scanner 12. The reflected and deflected beam forms an image through an image-formation optical system constructed of a third transmitting surface 3T, a second reflecting surface 2R, a third reflecting (total reflection) surface 3R and a fourth transmitting surface 4T on the surface to be scanned, thereby two-dimensionally scanning that surface.

In this example, the f arcsine θ lens characteristics are more improved than that in Example 1. The f arcsine θ lens characteristics are achieved for the sinusoidally vibrating scan mirror 12 at about 70% of the amplitude of the deflection angle of the scan mirror in both the X-direction and the Y-direction.

It is noted that if lenses, etc. are added between the prism 10 where distortions are easy to control and the surface to be scanned, the f arcsine θ lens characteristics can then be even more improved.

EXAMPLE 3

Figure 5:
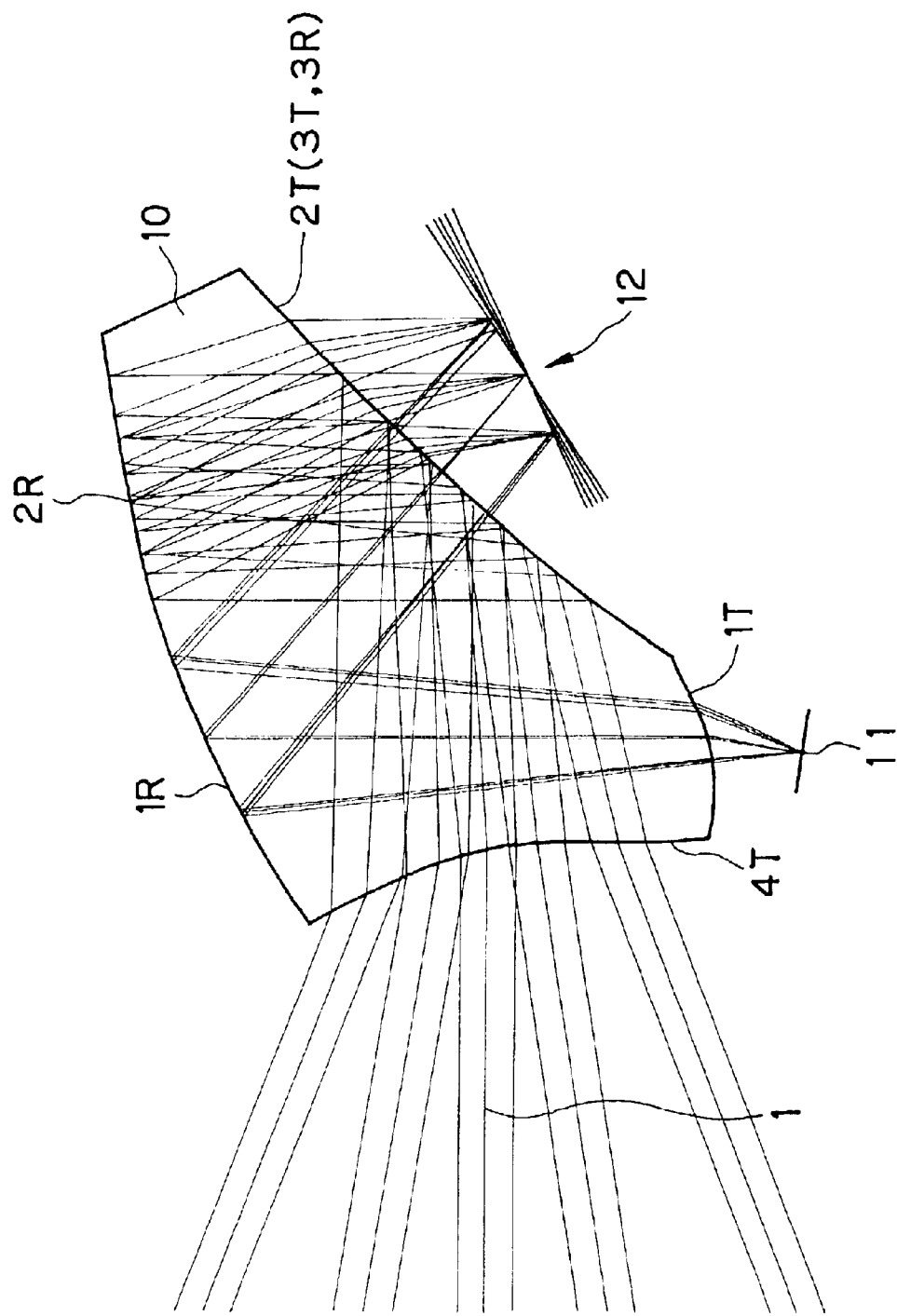
FIG. 5 is an optical path diagram for Example 3 of the scanning optical system according to the present invention.

The scanning optical system of this example is shown in FIG. 5 similar to FIG. 1, and has a horizontal field angle of 54° and a vertical field angle of 42° while the optical deflection means is φ1 mm in size.

This scanning optical system 10 is constructed as in Example 1 or 2. To be specific, the luminance of a light source 11 is modulated by means (not shown) for modulating the luminance of a light source depending on image signals for two-dimensional scanning (raster scanning) depending on the image signals, thereby forming an image on the surface to be scanned, located in front of the image-formation optical system and at a position 1 mm away therefrom, to two-dimensionally scan that surface.

Referring to an optical path for this scanning optical system 10 in forward ray tracing from the light source 11 to an image plane (the surface to be scanned, not shown), a light beam from the light source is collimated by a condensing optical system constructed of a first transmitting surface 1T, a first reflecting surface 1R and a second transmitting surface 2T into a substantially parallel beam, which is in turn reflected and deflected at a two-dimensional scanner 12. The reflected and deflected beam forms an image through an image-formation optical system constructed of a third transmitting surface 3T, a second reflecting surface 2R, a third reflecting (total reflection) surface 3R and a fourth transmitting surface 4T on the surface to be scanned, thereby two-dimensionally scanning that surface.

In this example, when the deflection means 12 with a linearly changing angle of deflection such as a rotary polygon mirror is used, the image-formation optical system is configured in such an fθ lens (a two-dimensional fθ lens with respect to the main scanning direction in the X-direction and the sub-scanning direction in the Y-direction) form that the surface to be scanned is scanned at constant speed.

EXAMPLE 4

Figure 6:
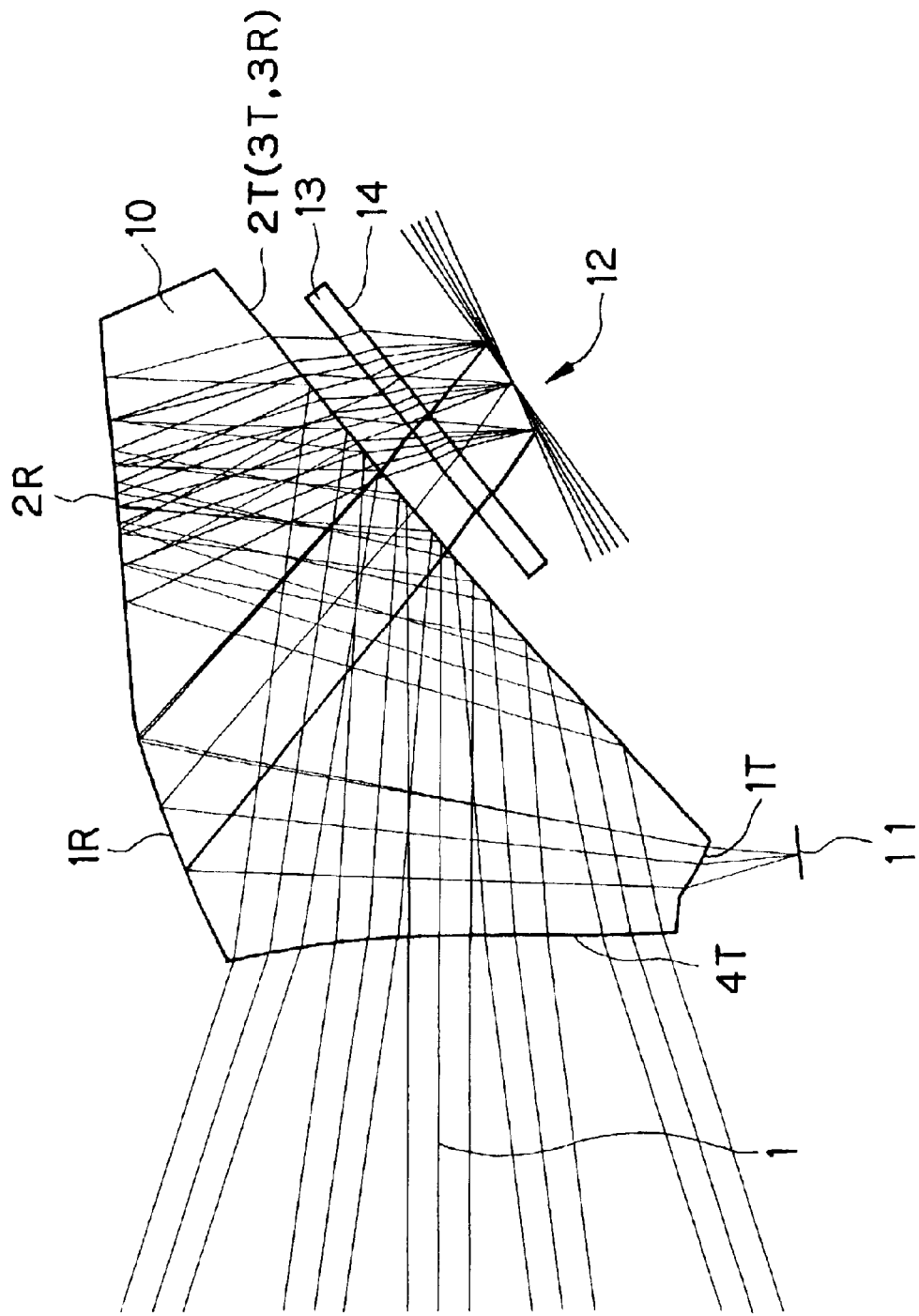
FIG. 6 is an optical path diagram for Example 4 of the scanning optical system according to the present invention.

The scanning optical system of this example is shown in FIG. 6 similar to FIG. 1, and has a horizontal field angle of 47° and a vertical field angle of 36° while the optical deflection means is φ1.1 mm in size.

This scanning optical system 10 is constructed as in Example 1, 2 or 3 with the exception that a DOE (diffractive optical element) 13 is interposed between a prism 10 and a scanner 12. To be specific, the luminance of a light source 11 is modulated by means (not shown) for modulating the luminance of a light source depending on image signals for two-dimensional scanning (raster scanning) depending on the image signals, thereby forming an image on the surface to be scanned, located in front of the image-formation optical system and at a position 1 mm away therefrom, to two-dimensionally scan that surface.

Referring to an optical path for this scanning optical system 10 in forward ray tracing from the light source 11 to an image plane (the surface to be scanned, not shown), a light beam from the light source is collimated by a condensing optical system constructed of a first transmitting surface 1T, a first reflecting surface 1R, a second transmitting surface 2T and DOE 13 with a diffracting surface 14 located in opposition to the scanner 12 into a substantially parallel beam, which is in turn reflected and deflected at a two-dimensional scanner 12. The reflected and deflected beam forms an image through an image-formation optical system constructed of DOE 13 with the diffracting surface 14 facing the scanner 12, a third transmitting surface 3T, a second reflecting surface 2R, a third reflecting (total reflection) surface 3R and a fourth transmitting surface 4T on the surface to be scanned, thereby two-dimensionally scanning that surface.

In this example, the DOE 13 is interposed between the prism 10 and the scanner 12 to correct the scanning optical system for chromatic aberrations. The DOE 13 works both on the beam leaving the condensing optical system and directing to the scanner 12 and on the beam incident from the scanner 12 on the image-formation optical system.

It is noted that when a micromachined scanner is used as the two-dimensional scanner 12, it may be made integral with the scanner 12. For instance, a substrate with ODE 13 formed thereon may be used as a protecting or sealing member for the scanner 12.

EXAMPLE 5

Figure 7:
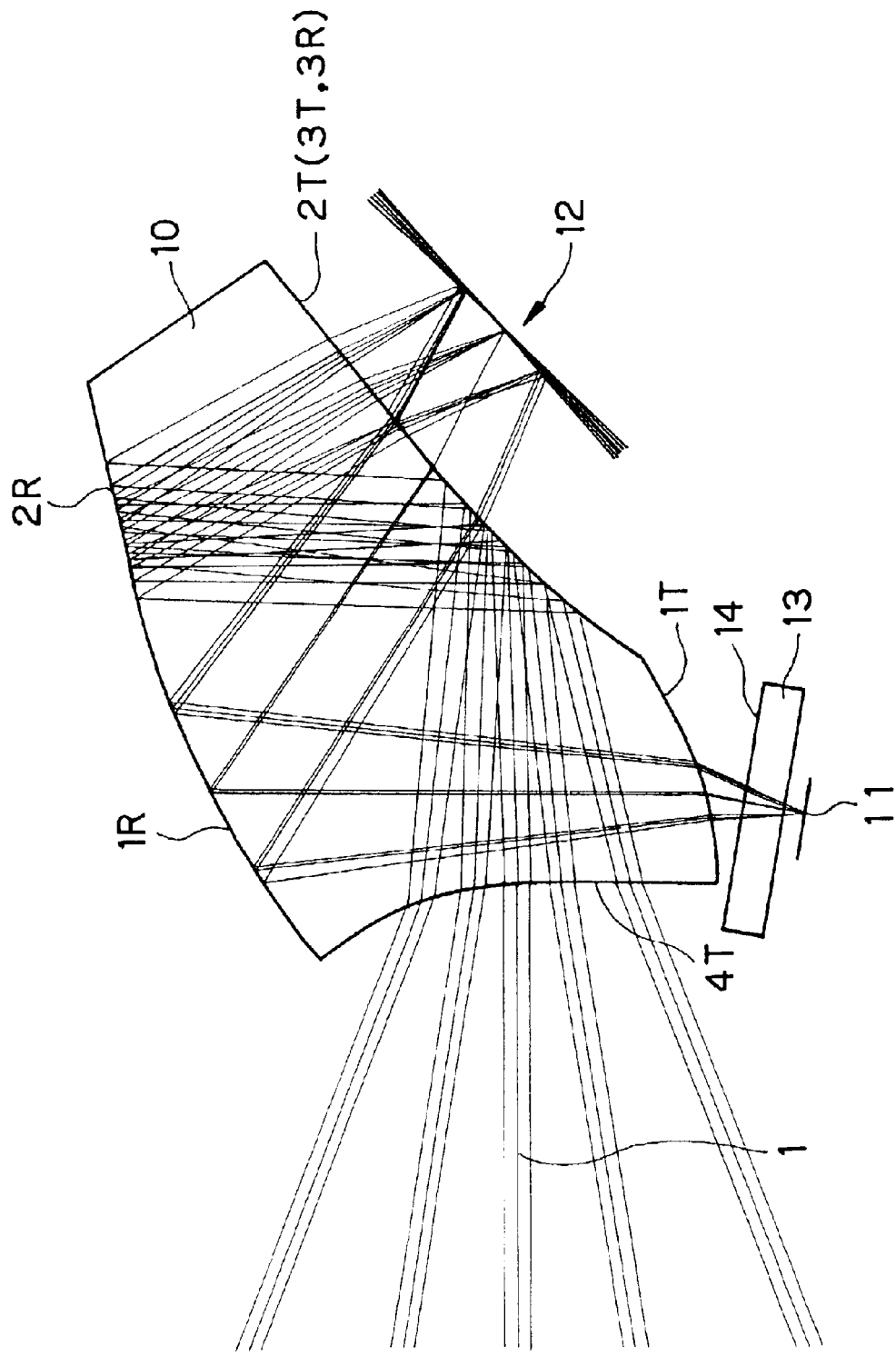
FIG. 7 is an optical path diagram for Example 5 of the scanning optical system according to the present invention.
Figures 9A, 9B:
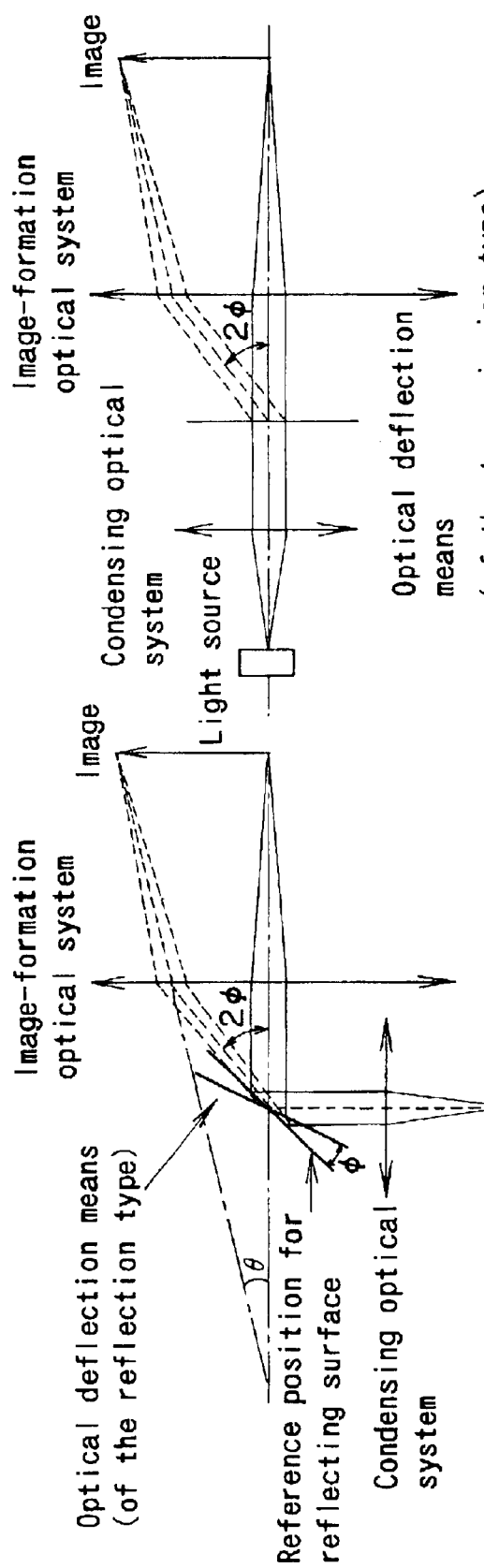
FIG. 9(a) is illustrative of the basic construction of a reflection type of optical deflection means.
FIG. 9(b) is illustrative of the basic construction of a transmission type of optical deflection means.
Figure 10:
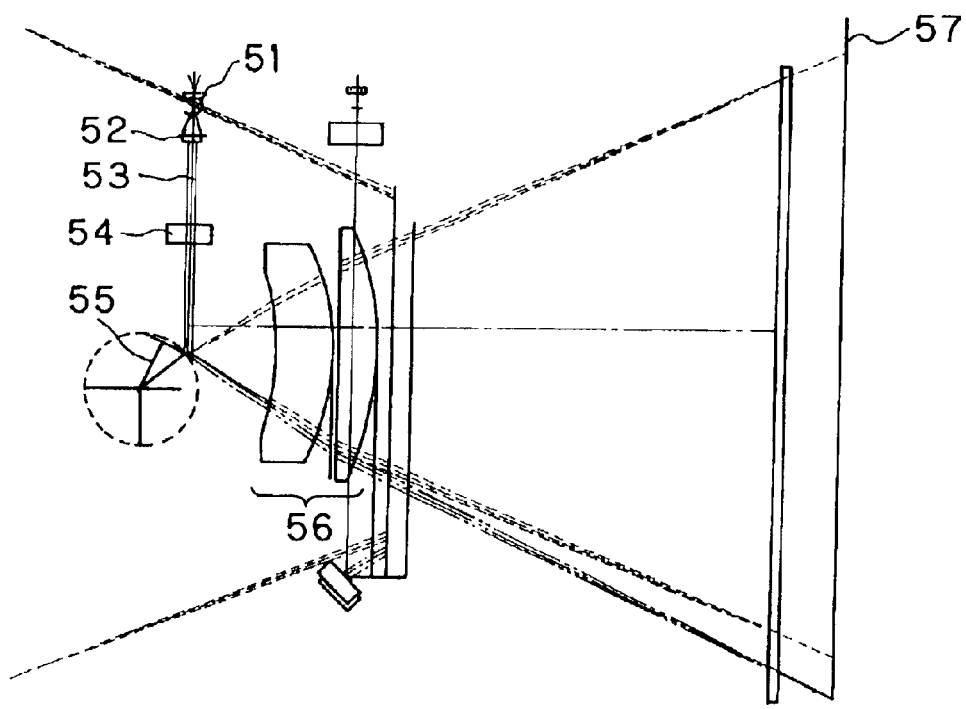
FIG. 10 is illustrative of the construction of another conventional scanning optical system.
Figure 11:
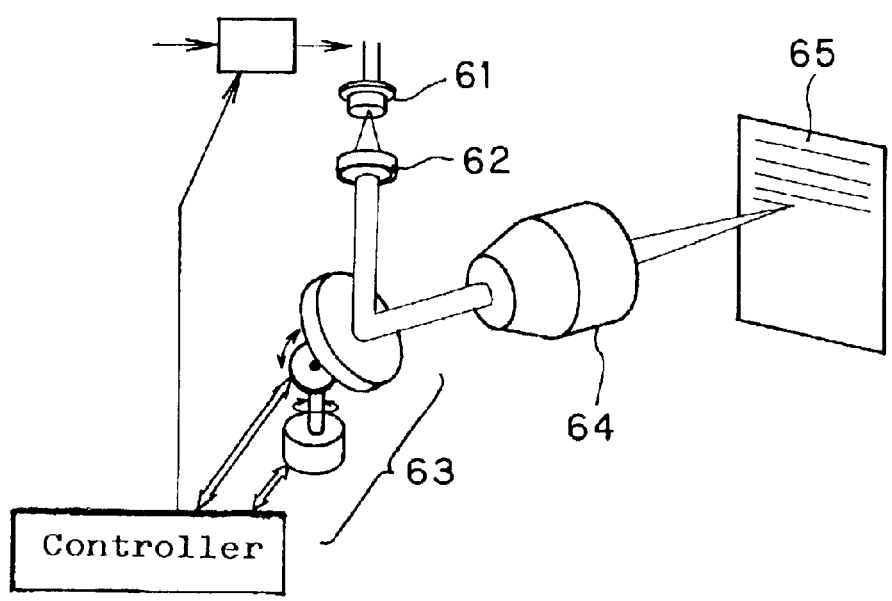
FIG. 11 is illustrative of the construction of yet another conventional scanning optical system.

The scanning optical system of this example is shown in FIG. 7 similar to FIG. 1. This scanning optical system 10 is constructed as in Example 1, 2 or 3 with the exception that a DOE 13 is interposed between a light source 11 and a prism 10. To be specific, the luminance of a light source 11 is modulated by means (not shown) for modulating the luminance of a light source depending on image signals for two-dimensional scanning (raster scanning) depending on the image signals, thereby forming an image on the surface to be scanned, located in front of the image-formation optical system and at a position 1 mm away therefrom, to two-dimensionally scan that surface.

Referring to an optical path for this scanning optical system 10 in forward ray tracing from the light source 11 to an image plane (the surface to be scanned, not shown), a light beam from the light source is collimated by a condensing optical system constructed of DOE 13 with a diffracting surface 14 in opposition to the prism 10, a first transmitting surface 1T, a first reflecting surface 1R and a second transmitting surface 2T into a substantially parallel beam, which is in turn reflected and deflected at a two-dimensional scanner 12. The reflected and deflected beam forms an image through an image-formation optical system constructed of a third transmitting surface 3T, a second reflecting surface 2R, a third reflecting (total reflection) surface 3R and a fourth transmitting surface 4T on the surface to be scanned, thereby two-dimensionally scanning that surface.

In this example, the DOE 13 is interposed between the light source 11 and the prism 10 to correct the scanning optical system for chromatic aberrations.

EXAMPLE 6

The scanning optical system of this example is shown in FIG. 8 similar to FIG. 1. This is a one-dimensional scanning optical system having a horizontal field angle of 82°, and comprising a scanner of φ2.6 mm in size.

This scanning optical system 10 is substantially constructed as in Example 1. To be specific, the luminance of a light source 11 is modulated by means (not shown) for modulating the luminance of a light source depending on image signals for one-dimensional scanning in the horizontal (X) direction depending on the image signals, thereby forming an image on the surface to be scanned, located in front of the first surface 4T going back to a non-decentered state and at a position 1 mm away therefrom, to two-dimensionally scan that surface.

Referring to an optical path for this scanning optical system 10 in forward ray tracing from the light source 11 to an image plane (the surface to be scanned, not shown), a light beam from the light source is collimated by a condensing optical system constructed of a first transmitting surface 1T, a first reflecting surface 1R and a second transmitting surface 2T into a substantially parallel beam, which is in turn reflected and deflected at a two-dimensional scanner 12. The reflected and deflected beam forms an image through an image-formation optical system constructed of a third transmitting surface 3T, a second reflecting surface 2R, a third reflecting (total reflection) surface 3R and a fourth transmitting surface 4T on the surface to be scanned, thereby one-dimensionally scanning that surface.

In this example, the main scanning (X) direction has f arcsine θ lens characteristics at 95% of the amplitude of the deflection angle of the scanner with the deflection angle changing sinusoidally.

Set out below are the constitutional parameters (lens data) of Examples 1 to 6. In the following data, "FFS", "RS" and "DOE" stand for a free-form surface, a reflecting surface and a diffracting surface, respectively. It is noted that the scanner is located at a stop surface and the light source is positioned on an image plane.

EXAMPLE 1

| Surface No. | Radius of curvature | Surface separation | Displacement and tilt | Refractive index | Abbe's No. |
|---|---|---|---|---|---|
| Object plane | ∞ | 1000.00 | | | |
| 1 | F F S ① | | (1) | 1.5254 | 56.3 |
| 2 | F F S ② (RS) | | (2) | 1.5254 | 56.3 |
| 3 | F F S ③ (RS) | | (3) | 1.5254 | 56.3 |
| 4 | F F S ② | | (2) | | |
| 5 | ∞ (Stop) | | (4) | | |
| 6 | F F S ② | | (2) | 1.5254 | 56.3 |
| 7 | F F S ④ (RS) | | (5) | 1.5254 | 56.3 |
| 8 | F F S ⑤ | | (6) | | |
| Image plane | ∞ | | (7) | | |

F F S ①

| $C_4$ | $-2.5779 \times 10^{-2}$ | $C_6$ | $-1.2030 \times 10^{-1}$ | $C_8$ | $-1.1075 \times 10^{-2}$ |
| $C_{10}$ | $-1.8153 \times 10^{-2}$ | $C_{11}$ | $2.5232 \times 10^{-4}$ | $C_{13}$ | $7.6132 \times 10^{-3}$ |
| $C_{15}$ | $3.4561 \times 10^{-3}$ | $C_{17}$ | $1.9873 \times 10^{-4}$ | $C_{19}$ | $2.2454 \times 10^{-4}$ |
| $C_{21}$ | $6.3462 \times 10^{-4}$ | $C_{22}$ | $1.9509 \times 10^{-6}$ | $C_{24}$ | $-1.1858 \times 10^{-4}$ |
| $C_{26}$ | $-2.2337 \times 10^{-4}$ | $C_{28}$ | $-1.0408 \times 10^{-4}$ | | |

F F S ②

| $C_4$ | $7.7922 \times 10^{-4}$ | $C_6$ | $7.7495 \times 10^{-3}$ | $C_8$ | $3.7699 \times 10^{-3}$ |
| $C_{10}$ | $-2.3003 \times 10^{-3}$ | $C_{11}$ | $3.8795 \times 10^{-4}$ | $C_{13}$ | $2.1619 \times 10^{-3}$ |
| $C_{15}$ | $2.1746 \times 10^{-4}$ | $C_{17}$ | $3.0215 \times 10^{-5}$ | $C_{19}$ | $4.7146 \times 10^{-4}$ |
| $C_{21}$ | $5.4788 \times 10^{-5}$ | $C_{22}$ | $-2.2446 \times 10^{-6}$ | $C_{24}$ | $6.4487 \times 10^{-5}$ |
| $C_{26}$ | $6.0274 \times 10^{-5}$ | $C_{28}$ | $7.6776 \times 10^{-6}$ | | |

F F S ③

| $C_4$ | $-2.2371 \times 10^{-2}$ | $C_6$ | $1.1690 \times 10^{-2}$ | $C_8$ | $7.2963 \times 10^{-4}$ |
| $C_{10}$ | $6.5994 \times 10^{-4}$ | $C_{11}$ | $7.9455 \times 10^{-4}$ | $C_{13}$ | $1.1221 \times 10^{-3}$ |
| $C_{15}$ | $-1.4706 \times 10^{-5}$ | $C_{17}$ | $-9.7208 \times 10^{-4}$ | $C_{19}$ | $-6.3757 \times 10^{-4}$ |
| $C_{21}$ | $-3.9919 \times 10^{-5}$ | $C_{22}$ | $-1.0684 \times 10^{-4}$ | $C_{24}$ | $3.3217 \times 10^{-4}$ |
| $C_{26}$ | $1.1244 \times 10^{-4}$ | $C_{28}$ | $-2.2822 \times 10^{-6}$ | | |

F F S ④

| $C_4$ | $3.3846 \times 10^{-2}$ | $C_6$ | $2.9857 \times 10^{-2}$ | $C_8$ | $-9.7283 \times 10^{-3}$ |
| $C_{10}$ | $-5.0879 \times 10^{-3}$ | $C_{11}$ | $-2.5332 \times 10^{-3}$ | $C_{13}$ | $-4.6775 \times 10^{-4}$ |
| $C_{15}$ | $-1.1206 \times 10^{-3}$ | $C_{17}$ | $2.2389 \times 10^{-3}$ | $C_{19}$ | $1.5076 \times 10^{-3}$ |
| $C_{21}$ | $-2.6497 \times 10^{-4}$ | $C_{22}$ | $8.4446 \times 10^{-4}$ | $C_{24}$ | $1.6456 \times 10^{-3}$ |
| $C_{26}$ | $4.9022 \times 10^{-4}$ | $C_{28}$ | $-2.7959 \times 10^{-5}$ | | |

F F S ⑤

| $C_4$ | $-5.0621 \times 10^{-1}$ | $C_6$ | $-1.9566 \times 10^{-1}$ | $C_8$ | $-2.5991 \times 10^{-1}$ |
| $C_{10}$ | $-8.7768 \times 10^{-3}$ | $C_{11}$ | $3.1809 \times 10^{-1}$ | $C_{13}$ | $4.2980 \times 10^{-1}$ |
| $C_{15}$ | $2.6434 \times 10^{-2}$ | | | | |

Displacement and tilt(1)

| X | 0.00 | Y | -1.50 | Z | 0.00 |
| α | 0.00 | β | 0.00 | γ | 0.00 |

Displacement and tilt(2)

| X | 0.00 | Y | 0.62 | Z | 4.94 |
| α | -45.15 | β | 0.00 | γ | 0.00 |

Displacement and tilt(3)

| X | 0.00 | Y | 2.80 | Z | 2.00 |
| α | -73.15 | β | 0.00 | γ | 0.00 |

Displacement and tilt(4)

| X | 0.00 | Y | -1.00 | Z | 5.66 |
| α | -52.18 | β | 0.00 | γ | 0.00 |

Displacement and tilt(5)

| X | 0.00 | Y | 2.66 | Z | 1.68 |
| α | -66.23 | β | 0.00 | γ | 0.00 |

Displacement and tilt(6)

| X | 0.00 | Y | -3.05 | Z | 0.58 |
| α | -79.91 | β | 0.00 | γ | 0.00 |

Displacement and tilt(7)

| X | 0.00 | Y | -3.98 | Z | 0.78 |
| α | -100.29 | β | 0.00 | γ | 0.00 |

EXAMPLE 2

| Surface No. | Radius of curvature | Surface separation | Displacement and tilt | Refractive index | Abbe's No. |
|---|---|---|---|---|---|
| Object plane | ∞ | 1000.00 | | | |
| 1 | F F S ① | | (1) | 1.5254 | 56.3 |
| 2 | F F S ② (RS) | | (2) | 1.5254 | 56.3 |
| 3 | F F S ③ (RS) | | (3) | 1.5254 | 56.3 |
| 4 | F F S ② | | (2) | | |
| 5 | ∞ (Stop) | | (4) | | |
| 6 | F F S ② | | (2) | 1.5254 | 56.3 |
| 7 | F F S ④ (RS) | | (5) | 1.5254 | 56.3 |
| 8 | F F S ⑤ | | (6) | | |
| Image plane | ∞ | | (7) | | |

F F S ①

| $C_4$ | $1.2830 \times 10^{-2}$ | $C_6$ | $-1.0765 \times 10^{-1}$ | $C_8$ | $-6.8597 \times 10^{-3}$ |
| $C_{10}$ | $-7.3302 \times 10^{-3}$ | $C_{11}$ | $6.8784 \times 10^{-5}$ | $C_{13}$ | $2.0958 \times 10^{-3}$ |
| $C_{15}$ | $4.2746 \times 10^{-3}$ | $C_{17}$ | $-1.4056 \times 10^{-5}$ | $C_{19}$ | $2.1878 \times 10^{-4}$ |
| $C_{21}$ | $-5.6130 \times 10^{-4}$ | $C_{22}$ | $1.2335 \times 10^{-6}$ | $C_{24}$ | $-8.3175 \times 10^{-6}$ |
| $C_{26}$ | $-7.0819 \times 10^{-5}$ | $C_{28}$ | $3.5824 \times 10^{-5}$ | | |

F F S ②

| $C_4$ | $-1.2602 \times 10^{-3}$ | $C_6$ | $6.5870 \times 10^{-3}$ | $C_8$ | $8.6539 \times 10^{-4}$ |
| $C_{10}$ | $-1.4889 \times 10^{-3}$ | $C_{11}$ | $9.7681 \times 10^{-5}$ | $C_{13}$ | $6.7863 \times 10^{-4}$ |
| $C_{15}$ | $2.6351 \times 10^{-5}$ | $C_{17}$ | $-7.9227 \times 10^{-6}$ | $C_{19}$ | $1.2881 \times 10^{-4}$ |
| $C_{21}$ | $4.1327 \times 10^{-5}$ | $C_{22}$ | $-1.3352 \times 10^{-6}$ | $C_{24}$ | $-2.8331 \times 10^{-6}$ |
| $C_{26}$ | $1.2199 \times 10^{-5}$ | $C_{28}$ | $5.7971 \times 10^{-6}$ | | |

F F S ③

| $C_4$ | $-1.9853 \times 10^{-2}$ | $C_6$ | $1.2833 \times 10^{-2}$ | $C_8$ | $-5.2848 \times 10^{-4}$ |
| $C_{10}$ | $3.7366 \times 10^{-4}$ | $C_{11}$ | $2.2434 \times 10^{-4}$ | $C_{13}$ | $6.4856 \times 10^{-4}$ |
| $C_{15}$ | $1.9609 \times 10^{-6}$ | $C_{17}$ | $2.1708 \times 10^{-5}$ | $C_{19}$ | $-3.0213 \times 10^{-4}$ |
| $C_{21}$ | $-1.6660 \times 10^{-5}$ | $C_{22}$ | $-3.2798 \times 10^{-5}$ | $C_{24}$ | $-2.4481 \times 10^{-6}$ |
| $C_{26}$ | $4.3731 \times 10^{-5}$ | $C_{28}$ | $-3.4736 \times 10^{-6}$ | | |

F F S ④

| $C_4$ | $3.5143 \times 10^{-2}$ | $C_6$ | $2.9244 \times 10^{-2}$ | $C_8$ | $-1.0733 \times 10^{-2}$ |
| $C_{10}$ | $-4.6492 \times 10^{-3}$ | $C_{11}$ | $-3.7851 \times 10^{-3}$ | $C_{13}$ | $-4.4587 \times 10^{-3}$ |
| $C_{15}$ | $-1.1223 \times 10^{-3}$ | $C_{17}$ | $-1.5160 \times 10^{-3}$ | $C_{19}$ | $-1.2923 \times 10^{-3}$ |
| $C_{21}$ | $-3.0248 \times 10^{-4}$ | $C_{22}$ | $-4.5680 \times 10^{-4}$ | $C_{24}$ | $-1.2579 \times 10^{-4}$ |
| $C_{26}$ | $-1.7631 \times 10^{-4}$ | $C_{28}$ | $-3.7567 \times 10^{-5}$ | | |

F F S ⑤

| $C_4$ | $-4.7149 \times 10^{-1}$ | $C_6$ | $-1.8302 \times 10^{-1}$ | $C_8$ | $-1.5918 \times 10^{-1}$ |
| $C_{10}$ | $-1.0259 \times 10^{-2}$ | $C_{11}$ | $1.8967 \times 10^{-1}$ | $C_{13}$ | $2.7011 \times 10^{-1}$ |
| $C_{15}$ | $2.3839 \times 10^{-2}$ | | | | |

Displacement and tilt(1)

| X | 0.00 | Y | -1.50 | Z | 0.00 |
| α | 0.00 | β | 0.00 | γ | 0.00 |

-continued

|  | Displacement and tilt(2) | | | | |
|---|---|---|---|---|---|
| X | 0.00 | Y | 0.91 | Z | 4.98 |
| α | −46.60 | β | 0.00 | γ | 0.00 |
|  | Displacement and tilt(3) | | | | |
| X | 0.00 | Y | 2.80 | Z | 1.83 |
| α | −73.91 | β | 0.00 | γ | 0.00 |
|  | Displacement and tilt(4) | | | | |
| X | 0.00 | Y | −1.00 | Z | 5.62 |
| α | −50.77 | β | 0.00 | γ | 0.00 |
|  | Displacement and tilt(5) | | | | |
| X | 0.00 | Y | 2.64 | Z | 1.67 |
| α | −65.89 | β | 0.00 | γ | 0.00 |
|  | Displacement and tilt(6) | | | | |
| X | 0.00 | Y | −3.05 | Z | 0.60 |
| α | −79.70 | β | 0.00 | γ | 0.00 |
|  | Displacement and tilt(7) | | | | |
| X | 0.00 | Y | −3.96 | Z | 0.83 |
| α | −98.37 | β | 0.00 | γ | 0.00 |

EXAMPLE 3

| Surface No. | Radius of curvature | Surface separation | Displacement and tilt | Refractive index | Abbe's No. |
|---|---|---|---|---|---|
| Object plane | ∞ | 1000.00 | | | |
| 1 | FFS① | | (1) | 1.5254 | 56.3 |
| 2 | FFS②(RS) | | (2) | 1.5254 | 56.3 |
| 3 | FFS③(RS) | | (3) | 1.5254 | 56.3 |
| 4 | FFS② | | (2) | | |
| 5 | ∞ (Stop) | | (4) | | |
| 6 | FFS② | | (2) | 1.5254 | 56.3 |
| 7 | FFS④(RS) | | (5) | 1.5254 | 56.3 |
| 8 | FFS⑤ | | (6) | | |
| Image plane | ∞ | | (7) | | |

FFS①

$C_4$ $2.0048 \times 10^{-3}$  $C_6$ $-6.5253 \times 10^{-2}$  $C_8$ $-2.1891 \times 10^{-3}$
$C_{10}$ $-5.2349 \times 10^{-2}$  $C_{11}$ $4.3385 \times 10^{-4}$  $C_{13}$ $2.5336 \times 10^{-3}$
$C_{15}$ $8.2781 \times 10^{-3}$  $C_{17}$ $-2.3112 \times 10^{-5}$  $C_{19}$ $-4.8161 \times 10^{-4}$
$C_{21}$ $3.6053 \times 10^{-3}$  $C_{22}$ $-5.0443 \times 10^{-6}$  $C_{24}$ $-1.0024 \times 10^{-5}$
$C_{26}$ $4.9410 \times 10^{-5}$  $C_{28}$ $-8.4784 \times 10^{-4}$

FFS②

$C_4$ $9.3276 \times 10^{-3}$  $C_6$ $1.2305 \times 10^{-2}$  $C_8$ $3.3701 \times 10^{-3}$
$C_{10}$ $6.2067 \times 10^{-4}$  $C_{11}$ $-2.6194 \times 10^{-4}$  $C_{13}$ $5.5084 \times 10^{-4}$
$C_{15}$ $-1.7807 \times 10^{-4}$  $C_{17}$ $-9.2688 \times 10^{-5}$  $C_{19}$ $2.3851 \times 10^{-4}$
$C_{21}$ $-6.1960 \times 10^{-5}$  $C_{22}$ $1.1482 \times 10^{-7}$  $C_{24}$ $-7.7827 \times 10^{-6}$
$C_{26}$ $4.1871 \times 10^{-5}$  $C_{28}$ $8.9363 \times 10^{-6}$

FFS③

$C_4$ $-1.1936 \times 10^{-2}$  $C_6$ $1.5613 \times 10^{-2}$  $C_8$ $9.8371 \times 10^{-4}$
$C_{10}$ $-3.2433 \times 10^{-4}$  $C_{11}$ $-5.0154 \times 10^{-4}$  $C_{13}$ $3.1318 \times 10^{-3}$
$C_{15}$ $-6.5157 \times 10^{-6}$  $C_{17}$ $-2.8893 \times 10^{-4}$  $C_{19}$ $-1.1561 \times 10^{-3}$
$C_{21}$ $3.2209 \times 10^{-5}$  $C_{22}$ $3.9739 \times 10^{-5}$  $C_{24}$ $7.0920 \times 10^{-5}$
$C_{26}$ $1.2812 \times 10^{-4}$  $C_{28}$ $-3.3532 \times 10^{-6}$

FFS④

$C_4$ $2.1168 \times 10^{-2}$  $C_6$ $3.1444 \times 10^{-2}$  $C_8$ $-1.2773 \times 10^{-2}$
$C_{10}$ $-4.9250 \times 10^{-3}$  $C_{11}$ $1.8772 \times 10^{-4}$  $C_{13}$ $-9.2233 \times 10^{-4}$
$C_{15}$ $-1.2437 \times 10^{-3}$  $C_{17}$ $2.5286 \times 10^{-2}$  $C_{19}$ $4.5186 \times 10^{-3}$
$C_{21}$ $-3.0342 \times 10^{-4}$  $C_{22}$ $1.6796 \times 10^{-2}$  $C_{24}$ $1.3450 \times 10^{-2}$
$C_{26}$ $1.6931 \times 10^{-3}$  $C_{28}$ $-2.7316 \times 10^{-5}$

FFS⑤

$C_4$ $-7.6734 \times 10^{-1}$  $C_6$ $-2.4281 \times 10^{-1}$  $C_8$ $1.0370 \times 10^{-2}$
$C_{10}$ $-3.9036 \times 10^{-2}$  $C_{11}$ $5.0781 \times 10^{-1}$  $C_{13}$ $3.5355 \times 10^{-1}$
$C_{15}$ $5.0029 \times 10^{-2}$

|  | Displacement and tilt(1) | | | | |
|---|---|---|---|---|---|
| X | 0.00 | Y | −1.50 | Z | 0.00 |
| α | 0.00 | β | 0.00 | γ | 0.00 |
|  | Displacement and tilt(2) | | | | |
| X | 0.00 | Y | 1.00 | Z | 5.00 |
| α | −44.98 | β | 0.00 | γ | 0.00 |
|  | Displacement and tilt(3) | | | | |
| X | 0.00 | Y | 2.76 | Z | 1.84 |
| α | −75.17 | β | 0.00 | γ | 0.00 |
|  | Displacement and tilt(4) | | | | |
| X | 0.00 | Y | −1.00 | Z | 4.95 |
| α | −60.82 | β | 0.00 | γ | 0.00 |
|  | Displacement and tilt(5) | | | | |
| X | 0.00 | Y | 2.60 | Z | 1.61 |
| α | −67.95 | β | 0.00 | γ | 0.00 |
|  | Displacement and tilt(6) | | | | |
| X | 0.00 | Y | −3.01 | Z | 0.75 |
| α | −83.98 | β | 0.00 | γ | 0.00 |
|  | Displacement and tilt(7) | | | | |
| X | 0.00 | Y | −3.97 | Z | 0.94 |
| α | −98.76 | β | 0.00 | γ | 0.00 |

EXAMPLE 4

| Surface No. | Radius of curvature | Surface separation | Displacement and tilt | Refractive index | Abbe's No. |
|---|---|---|---|---|---|
| Object plane | ∞ | 1000.00 | | | |
| 1 | FFS① | | (1) | 1.5254 | 56.3 |
| 2 | FFS②(RS) | | (2) | 1.5254 | 56.3 |
| 3 | FFS③(RS) | | (3) | 1.5254 | 56.3 |
| 4 | FFS② | | (2) | | |
| 5 | ∞ | | (4) | 1.5254 | 56.3 |
| 6 | ∞ | | (5) | 1001.00 | −3.45 |
| 7 | FFS④(DOE) | | (6) | | |
| 8 | ∞ (Stop) | | (7) | | |
| 9 | FFS④(DOE) | | (6) | 1001.00 | −3.45 |
| 10 | ∞ | | (5) | 1.5254 | 56.3 |
| 11 | ∞ | | (4) | | |
| 12 | FFS② | | (2) | 1.5254 | 56.3 |
| 13 | FFS⑤(RS) | | (8) | 1.5254 | 56.3 |
| 14 | FFS⑥ | | (9) | | |
| Image plane | ∞ | | (10) | | |

FFS①

$C_4$ $-5.1153 \times 10^{-3}$  $C_6$ $1.3925 \times 10^{-2}$  $C_8$ $-7.3841 \times 10^{-3}$
$C_{10}$ $-1.1875 \times 10^{-2}$  $C_{11}$ $-7.5853 \times 10^{-5}$  $C_{13}$ $1.2571 \times 10^{-3}$
$C_{15}$ $1.6283 \times 10^{-3}$  $C_{17}$ $5.6232 \times 10^{-5}$  $C_{19}$ $2.0110 \times 10^{-4}$
$C_{21}$ $-4.8468 \times 10^{-4}$  $C_{22}$ $9.0171 \times 10^{-7}$  $C_{24}$ $-1.1171 \times 10^{-5}$
$C_{26}$ $-2.0169 \times 10^{-5}$  $C_{28}$ $6.5369 \times 10^{-5}$

FFS②

$C_4$ $1.4932 \times 10^{-2}$  $C_6$ $-1.9540 \times 10^{-3}$  $C_8$ $4.4504 \times 10^{-3}$
$C_{10}$ $-2.4909 \times 10^{-3}$  $C_{11}$ $6.1319 \times 10^{-5}$  $C_{13}$ $8.8673 \times 10^{-4}$
$C_{15}$ $-2.8323 \times 10^{-4}$  $C_{17}$ $7.3968 \times 10^{-6}$  $C_{19}$ $4.5864 \times 10^{-5}$ -continued

| | | | | | |
|---|---|---|---|---|---|
| $C_{21}$ | $-2.3171 \times 10^{-6}$ | $C_{22}$ | $5.2961 \times 10^{-8}$ | $C_{24}$ | $-4.5057 \times 10^{-7}$ |
| $C_{26}$ | $-2.4771 \times 10^{-6}$ | $C_{28}$ | $1.8540 \times 10^{-6}$ | | |

FFS ③

| | | | | | |
|---|---|---|---|---|---|
| $C_4$ | $-2.9939 \times 10^{-3}$ | $C_6$ | $-1.1909 \times 10^{-2}$ | $C_8$ | $1.2713 \times 10^{-2}$ |
| $C_{10}$ | $-9.0051 \times 10^{-4}$ | $C_{11}$ | $-1.3110 \times 10^{-4}$ | $C_{13}$ | $-4.5404 \times 10^{-3}$ |
| $C_{15}$ | $5.2681 \times 10^{-4}$ | $C_{17}$ | $4.0962 \times 10^{-5}$ | $C_{19}$ | $1.1500 \times 10^{-3}$ |
| $C_{21}$ | $7.2718 \times 10^{-5}$ | $C_{22}$ | $-1.2274 \times 10^{-6}$ | $C_{24}$ | $-7.7261 \times 10^{-6}$ |
| $C_{26}$ | $-1.0427 \times 10^{-4}$ | $C_{28}$ | $-2.2896 \times 10^{-5}$ | | |

FFS ④

| | | | | | |
|---|---|---|---|---|---|
| $C_4$ | $-6.1596 \times 10^{-7}$ | $C_6$ | $3.4175 \times 10^{-6}$ | $C_8$ | $-3.2523 \times 10^{-6}$ |
| $C_{10}$ | $-9.3052 \times 10^{-7}$ | $C_{11}$ | $-4.0783 \times 10^{-7}$ | $C_{13}$ | $-5.9660 \times 10^{-6}$ |
| $C_{15}$ | $-2.3863 \times 10^{-6}$ | $C_{17}$ | $-2.8541 \times 10^{-7}$ | $C_{19}$ | $-1.9365 \times 10^{-6}$ |
| $C_{21}$ | $-5.8348 \times 10^{-7}$ | | | | |

FFS ⑤

| | | | | | |
|---|---|---|---|---|---|
| $C_4$ | $2.3949 \times 10^{-2}$ | $C_6$ | $3.3604 \times 10^{-2}$ | $C_8$ | $-5.7943 \times 10^{-4}$ |
| $C_{10}$ | $9.6778 \times 10^{-4}$ | $C_{11}$ | $-8.4834 \times 10^{-4}$ | $C_{13}$ | $-4.2016 \times 10^{-3}$ |
| $C_{15}$ | $2.3946 \times 10^{-4}$ | $C_{17}$ | $-3.0987 \times 10^{-3}$ | $C_{19}$ | $2.4318 \times 10^{-3}$ |
| $C_{21}$ | $-4.9242 \times 10^{-4}$ | $C_{22}$ | $7.0481 \times 10^{-5}$ | $C_{24}$ | $-2.4279 \times 10^{-3}$ |
| $C_{26}$ | $-1.3842 \times 10^{-3}$ | $C_{28}$ | $1.6279 \times 10^{-4}$ | | |

FFS ⑥

| | | | | | |
|---|---|---|---|---|---|
| $C_4$ | $-1.0093$ | $C_6$ | $-2.4736 \times 10^{-1}$ | $C_8$ | $-1.4848$ |
| $C_{10}$ | $-1.3260 \times 10^{-2}$ | $C_{11}$ | $2.9043 \times 10^{-1}$ | $C_{13}$ | $-8.9842 \times 10^{-1}$ |
| $C_{15}$ | $5.2718 \times 10^{-2}$ | | | | |

| Displacement and tilt(1) | | | | | |
|---|---|---|---|---|---|
| X | 0.00 | Y | -1.50 | Z | 0.00 |
| α | 0.00 | β | 0.00 | γ | 0.00 |

| Displacement and tilt(2) | | | | | |
|---|---|---|---|---|---|
| X | 0.00 | Y | 1.12 | Z | 5.50 |
| α | -50.08 | β | 0.00 | γ | 0.00 |

| Displacement and tilt(3) | | | | | |
|---|---|---|---|---|---|
| X | 0.00 | Y | 3.00 | Z | 2.00 |
| α | -87.13 | β | 0.00 | γ | 0.00 |

| Displacement and tilt(4) | | | | | |
|---|---|---|---|---|---|
| X | 0.00 | Y | 0.07 | Z | 5.03 |
| α | -50.80 | β | 0.00 | γ | 0.00 |

| Displacement and tilt(5) | | | | | |
|---|---|---|---|---|---|
| X | 0.00 | Y | 0.11 | Z | 5.46 |
| α | -50.799815 | β | 0.00 | γ | 0.00 |

| Displacement and tilt(6) | | | | | |
|---|---|---|---|---|---|
| X | 0.00 | Y | 0.57 | Z | 6.03 |
| α | -50.799876 | β | 0.00 | γ | 0.00 |

| Displacement and tilt(7) | | | | | |
|---|---|---|---|---|---|
| X | 0.00 | Y | -0.88 | Z | 5.60 |
| α | -59.62 | β | 0.00 | γ | 0.00 |

| Displacement and tilt(8) | | | | | |
|---|---|---|---|---|---|
| X | 0.00 | Y | 2.60 | Z | 1.00 |
| α | -67.35 | β | 0.00 | γ | 0.00 |

| Displacement and tilt(9) | | | | | |
|---|---|---|---|---|---|
| X | 0.00 | Y | -3.00 | Z | 1.11 |
| α | -107.34 | β | 0.00 | γ | 0.00 |

| Displacement and tilt(10) | | | | | |
|---|---|---|---|---|---|
| X | 0.00 | Y | -3.84 | Z | 0.84 |
| α | -83.74 | β | 0.00 | γ | 0.00 |

EXAMPLE 5

| Surface No. | Radius of curvature | Surface separation | Displacement and tilt | Refractive index | Abbe's No. |
|---|---|---|---|---|---|
| Object plane | ∞ | 1000.00 | | | |
| 1 | FFS ① | | (1) | 1.5254 | 56.3 |
| 2 | FFS ② (RS) | | (2) | 1.5254 | 56.3 |
| 3 | FFS ③ (RS) | | (3) | 1.5254 | 56.3 |
| 4 | FFS ② | | (2) | | |
| 5 | ∞ (Stop) | | (4) | | |
| 6 | FFS ② | | (2) | 1.5254 | 56.3 |
| 7 | FFS ④ (RS) | | (5) | 1.5254 | 56.3 |
| 8 | FFS ⑤ | | (6) | | |
| 9 | FFS ⑥ (DOE) | | (7) | 1001.00 | -3.45 |
| 10 | ∞ | | (8) | 1.5254 | 56.3 |
| 11 | ∞ | | (9) | | |
| Image plane | ∞ | | (10) | | |

FFS ①

| | | | | | |
|---|---|---|---|---|---|
| $C_4$ | $2.7110 \times 10^{-3}$ | $C_6$ | $-4.1822 \times 10^{-2}$ | $C_8$ | $-8.3156 \times 10^{-3}$ |
| $C_{10}$ | $-2.6287 \times 10^{-2}$ | $C_{11}$ | $-8.1512 \times 10^{-6}$ | $C_{13}$ | $4.1432 \times 10^{-3}$ |
| $C_{15}$ | $-6.5747 \times 10^{-4}$ | $C_{17}$ | $2.9008 \times 10^{-6}$ | $C_{19}$ | $1.9125 \times 10^{-4}$ |
| $C_{21}$ | $2.6876 \times 10^{-4}$ | $C_{22}$ | $-8.9097 \times 10^{-6}$ | $C_{24}$ | $-7.0018 \times 10^{-5}$ |
| $C_{26}$ | $2.5234 \times 10^{-6}$ | $C_{28}$ | $-3.2872 \times 10^{-5}$ | | |

FFS ②

| | | | | | |
|---|---|---|---|---|---|
| $C_4$ | $-6.3232 \times 10^{-3}$ | $C_6$ | $6.0261 \times 10^{-3}$ | $C_8$ | $-3.2915 \times 10^{-4}$ |
| $C_{10}$ | $-4.4498 \times 10^{-3}$ | $C_{11}$ | $-1.7090 \times 10^{-5}$ | $C_{13}$ | $1.7254 \times 10^{-3}$ |
| $C_{15}$ | $7.9047 \times 10^{-4}$ | $C_{17}$ | $-1.5791 \times 10^{-4}$ | $C_{19}$ | $3.8668 \times 10^{-4}$ |
| $C_{21}$ | $6.0282 \times 10^{-5}$ | $C_{22}$ | $-1.8162 \times 10^{-5}$ | $C_{24}$ | $-3.4431 \times 10^{-5}$ |
| $C_{26}$ | $5.1730 \times 10^{-5}$ | $C_{28}$ | $9.2060 \times 10^{-7}$ | | |

FFS ③

| | | | | | |
|---|---|---|---|---|---|
| $C_4$ | $-1.6315 \times 10^{-2}$ | $C_6$ | $1.2307 \times 10^{-2}$ | $C_8$ | $-1.8756 \times 10^{-3}$ |
| $C_{10}$ | $6.2970 \times 10^{-4}$ | $C_{11}$ | $9.5379 \times 10^{-5}$ | $C_{13}$ | $1.3103 \times 10^{-3}$ |
| $C_{15}$ | $-1.1967 \times 10^{-4}$ | $C_{17}$ | $-2.8876 \times 10^{-5}$ | $C_{19}$ | $-8.6467 \times 10^{-4}$ |
| $C_{21}$ | $-5.1857 \times 10^{-5}$ | $C_{22}$ | $-8.1252 \times 10^{-5}$ | $C_{24}$ | $1.2131 \times 10^{-4}$ |
| $C_{26}$ | $1.3258 \times 10^{-4}$ | $C_{28}$ | $6.3820 \times 10^{-6}$ | | |

FFS ④

| | | | | | |
|---|---|---|---|---|---|
| $C_4$ | $2.9891 \times 10^{-2}$ | $C_6$ | $3.0951 \times 10^{-2}$ | $C_8$ | $-9.3571 \times 10^{-3}$ |
| $C_{10}$ | $-5.2875 \times 10^{-3}$ | $C_{11}$ | $-5.1673 \times 10^{-3}$ | $C_{13}$ | $-5.1317 \times 10^{-4}$ |
| $C_{15}$ | $-1.1087 \times 10^{-3}$ | $C_{17}$ | $2.6635 \times 10^{-3}$ | $C_{19}$ | $1.8630 \times 10^{-3}$ |
| $C_{21}$ | $-2.6829 \times 10^{-4}$ | $C_{22}$ | $3.4886 \times 10^{-3}$ | $C_{24}$ | $1.8096 \times 10^{-3}$ |
| $C_{26}$ | $8.2598 \times 10^{-4}$ | $C_{28}$ | $-2.4770 \times 10^{-5}$ | | |

FFS ⑤

| | | | | | |
|---|---|---|---|---|---|
| $C_4$ | $-6.8396 \times 10^{-1}$ | $C_6$ | $-2.0892 \times 10^{-1}$ | $C_8$ | $-1.7517 \times 10^{-1}$ |
| $C_{10}$ | $-1.2761 \times 10^{-2}$ | $C_{11}$ | $4.5728 \times 10^{-1}$ | $C_{13}$ | $5.5687 \times 10^{-1}$ |
| $C_{15}$ | $3.3352 \times 10^{-2}$ | | | | |

FFS ⑥

| | | | | | |
|---|---|---|---|---|---|
| $C_4$ | $1.0559 \times 10^{-4}$ | $C_6$ | $3.9513 \times 10^{-5}$ | $C_8$ | $1.8847 \times 10^{-4}$ |
| $C_{10}$ | $1.6785 \times 10^{-4}$ | $C_{11}$ | $-2.8750 \times 10^{-4}$ | $C_{13}$ | $-4.6702 \times 10^{-3}$ |
| $C_{15}$ | $3.1902 \times 10^{-5}$ | $C_{17}$ | $4.4625 \times 10^{-3}$ | $C_{19}$ | $2.0071 \times 10^{-2}$ |
| $C_{21}$ | $-4.6995 \times 10^{-5}$ | | | | |

| Displacement and tilt(1) | | | | | |
|---|---|---|---|---|---|
| X | 0.00 | Y | -1.50 | Z | 0.00 |
| α | 0.00 | β | 0.00 | γ | 0.00 |

| Displacement and tilt(2) | | | | | |
|---|---|---|---|---|---|
| X | 0.00 | Y | 0.34 | Z | 4.92 |
| α | -50.44 | β | 0.00 | γ | 0.00 |

| Displacement and tilt(3) | | | | | |
|---|---|---|---|---|---|
| X | 0.00 | Y | 2.80 | Z | 1.89 |
| α | -74.09 | β | 0.00 | γ | 0.00 |

| Displacement and tilt(4) | | | | | |
|---|---|---|---|---|---|
| X | 0.00 | Y | -0.82 | Z | 5.86 |
| α | -46.70 | β | 0.00 | γ | 0.00 |

-continued

|  | Displacement and tilt(5) | | | | |
|---|---|---|---|---|---|
| X | 0.00 | Y | 2.64 | Z | 1.68 |
| α | −66.07 | β | 0.00 | γ | 0.00 |
|  | Displacement and tilt(6) | | | | |
| X | 0.00 | Y | −3.05 | Z | 0.54 |
| α | −81.32 | β | 0.00 | γ | 0.00 |
|  | Displacement and tilt(7) | | | | |
| X | 0.00 | Y | −3.34 | Z | 0.76 |
| α | −99.9998651 | β | 0.00 | γ | 0.00 |
|  | Displacement and tilt(8) | | | | |
| X | 0.00 | Y | −3.36 | Z | 0.83 |
| α | −100.00 | β | 0.00 | γ | 0.00 |
|  | Displacement and tilt(9) | | | | |
| X | 0.00 | Y | −3.79 | Z | 0.66 |
| α | −100.00 | β | 0.00 | γ | 0.00 |
|  | Displacement and tilt(10) | | | | |
| X | 0.00 | Y | −4.00 | Z | 0.71 |
| α | −101.17 | β | 0.00 | γ | 0.00 |

EXAMPLE 6

| Surface No. | Radius of curvature | Surface separation | Displacement and tilt | Refractive index | Abbe's No. |
|---|---|---|---|---|---|
| Object plane | ∞ | 10.00 | | | |
| 1 | F F S ① | | (1) | 1.5254 | 56.3 |
| 2 | F F S ② (RS) | | (2) | 1.5254 | 56.3 |
| 3 | F F S ③ (RS) | | (3) | 1.5254 | 56.3 |
| 4 | F F S ② | | (2) | | |
| 5 | ∞ (Stop) | | (4) | | |
| 6 | F F S ② | | (2) | 1.5254 | 56.3 |
| 7 | F F S ④ (RS) | | (5) | 1.5254 | 56.3 |
| 8 | F F S ⑤ | | (6) | | |
| Image plane | ∞ | | (7) | | |

F F S ①

$C_4$ −1.4579 × 10⁻² $C_6$ −1.0257 × 10⁻¹ $C_8$ −9.2040 × 10⁻⁴
$C_{10}$ −1.0489 × 10⁻² $C_{11}$ −9.9035 × 10⁻⁵ $C_{13}$ 5.9168 × 10⁻³
$C_{15}$ 4.8469 × 10⁻³ $C_{17}$ −8.7514 × 10⁻⁶ $C_{19}$ 1.2191 × 10⁻³
$C_{21}$ −9.9794 × 10⁻⁴

F F S ②

$C_4$ 1.3960 × 10⁻² $C_6$ 1.2346 × 10⁻² $C_8$ 2.4723 × 10⁻³
$C_{10}$ 1.0147 × 10⁻⁴ $C_{11}$ −1.6176 × 10⁻⁴ $C_{13}$ 8.1886 × 10⁻⁴
$C_{15}$ 2.0947 × 10⁻⁵ $C_{17}$ −1.7977 × 10⁻⁴ $C_{19}$ 4.1117 × 10⁻⁵
$C_{21}$ −1.1700 × 10⁻⁴

F F S ③

$C_4$ 9.3942 × 10⁻³ $C_6$ 1.7229 × 10⁻² $C_8$ 2.3970 × 10⁻³
$C_{10}$ 3.5790 × 10⁻⁵ $C_{11}$ 2.9999 × 10⁻⁴ $C_{13}$ 3.8118 × 10⁻⁵
$C_{15}$ −1.6410 × 10⁻⁴ $C_{17}$ −1.3152 × 10⁻⁴ $C_{19}$ −1.6937 × 10⁻⁵
$C_{21}$ −5.3560 × 10⁻⁶

F F S ④

$C_4$ 4.6653 × 10⁻² $C_6$ 3.4104 × 10⁻² $C_8$ −1.6228 × 10⁻²
$C_{10}$ −7.5431 × 10⁻³ $C_{11}$ −3.0449 × 10⁻³ $C_{13}$ −1.8865 × 10⁻³
$C_{15}$ 7.5485 × 10⁻⁴ $C_{17}$ 1.5596 × 10⁻³ $C_{19}$ 1.3141 × 10⁻³
$C_{21}$ 4.0652 × 10⁻⁴

F F S ⑤

$C_4$ −3.3176 × 10⁻¹ $C_6$ −1.4184 × 10⁻¹ $C_8$ 2.4167 × 10⁻¹
$C_{10}$ 1.2728 × 10⁻¹ $C_{11}$ 8.8749 × 10⁻² $C_{13}$ −1.0491 × 10⁻¹
$C_{15}$ −6.7796 × 10⁻²

|  | Displacement and tilt(1) | | | | |
|---|---|---|---|---|---|
| X | 0.00 | Y | 0.58 | Z | 0.00 |
| α | 0.00 | β | 0.00 | γ | 0.00 |
|  | Displacement and tilt(2) | | | | |
| X | 0.00 | Y | 1.20 | Z | 4.13 |
| α | −47.90 | β | 0.00 | γ | 0.00 |
|  | Displacement and tilt(3) | | | | |
| X | 0.00 | Y | 1.40 | Z | 0.70 |
| α | −68.85 | β | 0.00 | γ | 0.00 |
|  | Displacement and tilt(4) | | | | |
| X | 0.00 | Y | −1.00 | Z | 4.40 |
| α | −48.05 | β | 0.00 | γ | 0.00 |
|  | Displacement and tilt(5) | | | | |
| X | 0.00 | Y | 1.78 | Z | 1.68 |
| α | −65.43 | β | 0.00 | γ | 0.00 |
|  | Displacement and tilt(6) | | | | |
| X | 0.00 | Y | −1.39 | Z | 1.33 |
| α | −61.77 | β | 0.00 | γ | 0.00 |
|  | Displacement and tilt(7) | | | | |
| X | 0.00 | Y | −2.47 | Z | 1.04 |
| α | −97.55 | β | 0.00 | γ | 0.00 |

The values of conditions (1) and (2) in Examples 1 through 6 are given below. It is understood that when upper and lower marginal light rays are asymmetric with respect to a chief light ray, NAy (NA2) is found by averaging both.

| Ex. | (A) | (B) | (C) | (D) | (E) | (F) | (G) | (H) |
|---|---|---|---|---|---|---|---|---|
| 1 | ±7.95 | ±3.20 | 0.59 | 0.30 | 0.52 | 0.16 | 0.19 | 1.20 |
| 2 | ±10.6 | ±4.42 | 0.79 | 0.42 | 0.54 | 0.15 | 0.19 | 1.28 |
| 3 | ±12.6 | ±4.87 | 0.93 | 0.46 | 0.50 | 0.25 | 0.26 | 1.02 |
| 4 | ±12.2 | ±6.10 | 1.04 | 0.68 | 0.65 | 0.13 | 0.18 | 1.41 |
| 5 | ±10.0 | ±2.45 | 0.74 | 0.23 | 0.32 | 0.14 | 0.26 | 1.91 |
| 6 | ±20.5 | | | | | 0.22 | 0.37 | 1.73 |

(A): Deflection angle of the scanner necessary for scanning (°) $\phi_2$
(B): Deflection angle of the scanner necessary for scanning (°) $\phi_1$
(C): Pupil magnification X pupil magnification $2\phi_1/\theta_1$
(D): Pupil magnification Y pupil magnification $2\phi_2/\theta_2$
(E): Y pupil magnification/X pupil magnification $(\phi_2 \times \theta_1) \div (\phi_1 \times \theta_2)$
(F): NA on the light source side NAx (NA1)
(G): NA on the light source side NAy (NA2)
(H): NA on the light source side NAx/NAy (NA1/NA2)

While Examples 1 to 6 of the scanning optical system are constructed using the free-form surfaces conforming to the aforesaid defining formula (a), it is understood that the optical system of the invention may be constructed even with curved surfaces that meet other defining formulae.

While the scanning optical system of the present invention has been described with reference to several embodiments, it is understood that the invention is not limited thereto and so many modifications thereto may be possible.

According to the present invention wherein the scanning optical system is constructed mainly with a prism member including a reflecting action, the number of parts that form the scanning optical system can be reduced with size reductions.

What we claim is:

1. A scanning optical system comprising:
    an optical deflection means for deflecting light from a light source to scan a surface to be scanned, and an image-formation optical system for focusing the light deflected by said optical deflection means on the surface to be scanned, thereby forming an image thereon, wherein:

said image-formation optical system comprises an optical member wherein a surface thereof having optical power and located nearest to the surface to be scanned has a transmission function alone, and said optical member comprises two or more reflecting surfaces, each of which has optical power and includes at least one rotationally asymmetric surface decentered, with respect to an axial chief ray.

2. The scanning optical system according to claim 1, wherein said optical member is configured as a prism member.

3. The scanning optical system according to claim 1, wherein said optical member has at least one surface having a function of transmitting light and a function of reflecting light.

4. A scanning optical system comprising:

a condensing optical system for collimating a light beam from a light source into a substantially parallel beam, an optical deflection means for deflecting light emerging from said condensing optical system for scanning a surface to be scanned, and an image-formation optical system for focusing light deflected by said optical deflection means on the surface to be scanned, thereby forming an image thereon, wherein:

a final surface of said beam-condensing optical system, through which a light beam leaving said condensing optical system enters into said optical deflection means, and a first surface of said image-formation optical system, through which a light beam enters from said optical deflection means into said image-formation optical system, are defined by a common surface.

5. The scanning optical system according to claim 4, wherein optically functional surfaces located before and after said optical deflection means are defined by transmitting surfaces.

6. The scanning optical system according to claim 4, wherein said optical member has at least one surface having a function of transmitting light and a function of reflecting light.

7. A scanning optical system comprising:

a condensing optical system for collimating a light beam from a light source into a substantially parallel beam, an optical deflection means for deflecting light emerging from said condensing optical system for scanning a surface to be scanned, and an image-formation optical system for focusing light deflected by said optical deflection means into the surface to be scanned, thereby forming an image thereon, wherein:

said scanning optical system comprises a prism member, and said prism member includes at least a portion of said condensing optical system, and at least a portion of said image-formation optical system, and said optical deflection means is located at a position where the light emerging from said condensing optical system is reflected toward said image-forming optical system.

8. The scanning optical system according to claim 7, wherein said condensing optical system and said image-formation optical system are constructed of one prism member.

9. A scanning optical system according to claim 1, comprising:

a beam-condensing optical system for collimating a light beam from a light source into a substantially parallel beam, said optical deflection means deflecting light emerging from said condensing optical system for scanning the surface to be scanned, and said image-formation optical system focusing light deflected by said optical deflection means into the surface to be scanned, thereby forming an image thereon, wherein:

a total of at least three reflections occur at said condensing optical system and said image-formation optical system.

10. The scanning optical system according to claim 7, wherein said prism member comprising at least a portion of said condensing optical system and at least a portion of said image-formation optical system has a combined transmitting and reflecting surface.

11. The scanning optical system according to claim 10, wherein said prism member comprising at least a portion of said condensing optical system and at least a portion of said image-formation optical system has a common surface having three optical actions, two transmission actions and one reflection action.

12. The scanning optical system according to claim 7, wherein:

the portion of said condensing optical system included in said prism member comprises at least three surfaces, an entrance surface for said prism member, a rotationally asymmetric reflecting surface that has optical power and is decentered with respect to an axial chief ray, and an exit surface from said prism member, and the portion of said image-formation optical system included in said prism member comprises at least three surfaces, a reentrance surface for said prism member, a rotationally asymmetric reflecting surface that has optical power and is decentered with respect to an axial chief ray, and an re-exit surface from said prism member.

13. The scanning optical system according to claim 1, wherein said optical deflection means is a two-dimensional optical deflection means that effects two-dimensional deflection at one optical deflection means.

* * * * *